United States Patent
Crookshanks

(10) Patent No.: US 7,089,203 B1
(45) Date of Patent: Aug. 8, 2006

(54) BUILDING CONSTRUCTION BID AND CONTRACT MANAGEMENT SYSTEM, INTERNET-BASED METHOD AND COMPUTER PROGRAM THEREFOR

(76) Inventor: Rex J. Crookshanks, 1901 Paseo del Sol, Palos Verdes Estates, CA (US) 90274

(*) Notice: Subject to any disclaimer, the term of this patent is extended or adjusted under 35 U.S.C. 154(b) by 1063 days.

(21) Appl. No.: 09/588,030

(22) Filed: Jun. 5, 2000

Related U.S. Application Data

(60) Provisional application No. 60/197,907, filed on Apr. 13, 2000, provisional application No. 60/174,989, filed on Jan. 7, 2000, provisional application No. 60/163,702, filed on Nov. 5, 1999, provisional application No. 60/137,576, filed on Jun. 4, 1999.

(51) Int. Cl.
*G06F 17/60* (2006.01)

(52) U.S. Cl. .................... 705/37; 345/543; 715/502
(58) Field of Classification Search ............. 705/37, 705/36; 345/543; 715/502
See application file for complete search history.

(56) References Cited

U.S. PATENT DOCUMENTS 3,581,072 A * 5/1971 Nymeyer ............ 705/37

(Continued)

OTHER PUBLICATIONS

PR Newswire (PNC Bank Launches Internet-Based Appraisal Ordering System For Commercial Real Estate Mortgages, New York: May 24, 1999, p. 2).*

Primary Examiner—Hyung Sough
Assistant Examiner—Ojo O. Oyebisi
(74) Attorney, Agent, or Firm—Innovation Law Group, Ltd.; Jacques M. Dulin, Esq.

(57) ABSTRACT

The present invention relates to a system and method ("Bid System") for topologically subdividing and defining the detail scope of work and for inter-linking construction plans and specifications to construction contracts and subcontracts. The Bid System permits full, clear and unambiguous definition of the scope of work under each subcontract, so as to eliminates errors and uncertainty relating to contract performance. The Bid System establishes a series of electronic overlays to the digitized construction plans corresponding to different trades or categories of work, in which each overlay may be divided into a series of optimized topological subdivisions or "boxes" which uniquely identify and locate on the plans a portion of the work to be performed. The system includes linkage of the overlays and boxes to the subcontracts whereby the scope of work to be bid is accurately associated or "mapped" to corresponding regions and overlay category on the architectural drawings or construction plans. This mapping of overlays to plans constitutes a system of almost-orthogonal equations having the property of progressively increasing transparency as the typical size of the subdivisions is reduced. The system and method also permits a bi-directional flow of information from the various entities involved in the bid process so as to enhance the clarity and detail of work description of both the contracts and the plans and specifications, thus permitting more efficient and effective monitoring and management of contract performance. Internet-based embodiments of the Bid System of the invention are described, including a central-server remote host Internet embodiment in which the transmittal of data, including plans, overlays, contracts, bids, comments, edits, changes and the like are via the Internet, the Bid System being operated principally on a central remote host operated by a Bid System Service Provider (BSSP). Distributed host Internet embodiments are also disclosed.

15 Claims, 17 Drawing Sheets

U.S. PATENT DOCUMENTS

| | | | |
|---|---|---|---|
| 5,129,061 A * | 7/1992 | Wang et al. | 345/418 |
| 5,189,606 A | 2/1993 | Burns et al. | 364/401 |
| 5,243,515 A * | 9/1993 | Lee | 705/37 |
| 5,689,705 A | 11/1997 | Fino et al. | 395/617 |
| 5,873,071 A * | 2/1999 | Ferstenberg et al. | 705/37 |
| 5,918,219 A * | 6/1999 | Isherwood | 705/37 |
| 5,950,206 A * | 9/1999 | Krause | 707/104.1 |
| 6,029,141 A * | 2/2000 | Bezos et al. | 705/27 |
| 6,038,547 A * | 3/2000 | Casto | 705/30 |
| 6,604,124 B1 * | 8/2003 | Archbold | 718/103 |

* cited by examiner

Figure 22 - Internet-Based Bid System

BUILDING CONSTRUCTION BID AND CONTRACT MANAGEMENT SYSTEM, INTERNET-BASED METHOD AND COMPUTER PROGRAM THEREFOR

RELATED APPLICATION

This Regular Application is related to and claims the priority of the following United States Provisional Patent Applications by the same inventor as the present application: Application No. 60/137,576, filed Jun. 4, 1999; Application No. 60/163,702, filed Nov. 5, 1999; Application No. 60/174,989, filed Jan. 7, 2000, and Application 60/197,907 filed Apr. 13, 2000. These prior applications are incorporated herein by reference.

TECHNICAL FIELD

The invention relates to computer-assisted construction bidding and contract administration, and in particular to a system and method for topologically subdividing and defining the detail of the scope of work and for inter-linking construction plans and specifications to construction contracts and subcontracts. The system and method employs a system of almost-orthogonal equations which permits increasing the detail specificity of the work scope as the degree of sub-division of the plans increases, thus eliminating errors and uncertainty relating to the performance of construction contracts. The system and method also permits a bi-directional flow of information during the bidding process and construction process so as to enhance the clarity and detail of work description of both the contracts and the plans and specifications, thus permitting more efficient and effective monitoring and management of contract performance. The system of the invention includes a method of Internet-based electronic project management services for developers, owners, contractors and sub-contractors, architects, financial institutions, and related affiliates for the design, construction and financing management of construction projects.

BACKGROUND

The construction industry is one of the cornerstones of the US and world economy. For example, in 1997 the construction industry in the US for more than 500 billion dollars of GNP. More than 200 billion dollars are spent on the construction of new dwellings each year.

A substantial portion of the cost of construction is due to the expenses of cost estimation, the administration of the bidding process, contract and sub-contract management, generating documentation needed for financing, and allowances for contingencies. In addition, major cost increments are frequently experienced due to errors in cost estimation, mistakes in bidding, and in dispute resolution with respect to contract obligations, performance responsibility and change orders. Indeed, it can be said that major cost overruns are more typical than not. It has been estimated that such contingencies and problems add 30% or more to the overall cost of the work, and resultant schedule delays cause further consequential losses. Given the enormous size of this sector of the economy, the cumulative inefficiencies, errors and uncertainties in the construction bidding process and in the administration of construction contracts represent a very important source of lost economic value to society.

A particular problem in the traditional approach to construction contract bidding, cost estimation, and management of contingencies stems from the inability to sufficiently detail the work description. In the existing approach to bidding, the plans and specifications are circulated with a description of the work to be bid to the respective subcontractors to price a portion of the work. Each subcontractor then estimates labor, material and administrative costs and profit based on the scope of work required. Each subcontractor's estimation of the scope of work is influenced by the subcontractor's own interpretation of the plans and specifications, and is based also on each subcontractor's assumptions as to the respective performance responsibilities of the general contractor and the many other subcontractors. Mistakes and inconsistencies of interpretation of the plans and the scope of each bid are difficult, if not impossible, to avoid in traditional bidding.

Experience has taught contractors and subcontractors to add very substantial allowances to the bid price for the resulting contingencies, uncertainty, delays and dispute resolution costs. Likewise, owners and lenders of necessity also must allow for these contingencies and uncertainties, increasing the cost of capital and loan administration. In addition, the traditional bidding process does not provide an effective opportunity to correct errors, omissions and ambiguities in the plans and specifications prior to submission of the bids and awarding of contracts. Further, and of increasing significance, is the slow, by-hand and by-phone process of exchange of bid and contract management documentation and information.

These problems are manifest in spite of architect-prepared plans and sound engineering practice. Even where computer assisted design ("CAD") drawing and specification systems are employed, experience shows that there remains real uncertainty as to exactly what aspects of the project work are the responsibility of which subcontractor, and exactly how much labor and exactly what materials will be required for which subcontractor's performance. Likewise, portions of the scope of work which are inadvertently excluded form the subcontracting bids create additional contingencies and uncertainties for the general contractor, and controversies, often expensive and protracted, sorting out responsibility and liability for work and payment of costs.

If each bidding contractor and subcontractor could know that the work bid could be completed at a given bid price, there would be little need for contingency bidding. Likewise, an accurate and completely detailed description of the work being bid or constructed would assist in preventing or quickly resolving disputes concerning contract obligations and performance.

If information generated during the bidding process could be interactively channeled back and forth between the general contractors, architects and owners before the finalization of the contracts, many mistakes and ambiguities in the plans and specifications could be corrected in time, e.g., prior to contract let, to avoid change orders and disputes. When post-contract changes to the plans or specification are required due to circumstances which are unforeseeable at the time of bidding, a completely detailed description of the change of scope of work, and of the extent of needed modification of the general contract and each subcontract would allow such change orders to be managed quickly and fairly.

What is needed, and is not present in the prior art, is an interactive, computerized system and method, preferably communication enabled via the Internet, LANs or WANs, for controlling the construction bidding and contracting process to provide a certain and complete description of the scope of work required under each contract and subcontract so as to avoid inconsistencies, omissions, ambiguities and mistakes in the interpretation of plans and specifications, and for the ongoing management of the financing, and construction management phases of the project. What is also needed, and not present in the prior art is a means and method for systematically linking the construction plans and specifications to the bid and contract generation process so as to provide an interactive, bi-directional flow of information to increase the accuracy, completeness and clarity of both the contracts and the plans.

SUMMARY—INCLUDING OBJECTS AND ADVANTAGES OF THE INVENTION

This present invention provides an interactive, systematic topological approach to solving the problems of the traditional bidding process, and its integration into an Internet-based construction management business. The invention includes a computerized, Internet-based building construction bidding and contract management system and method (herein generally referred to collectively as "Bid Systems").

The Bid System of the invention establishes a series of "overlays" to the construction plans, in which each overlay corresponds to a different trade or bidding category of work. The overlay provides a representational "surface", aligned and oriented to the plans, upon which the detail nature of the work to be performed in a particular trade or category may be precisely topologically defined. The work in the overlay category contained in the plans is defined and functionally segregated by establishing selected topological subdivisions or of the overlay corresponding to the locations of the plan elements requiring the particular category of work.

The Bid System further includes linkage of the overlays and defining topological subdivisions to system-generated forms of contracts and subcontracts. By means of this linkage, the scope of work to be bid under the contract is accurately associated or "mapped" to corresponding subdivision regions and overlay category on the architectural drawings or construction plans. In other words, the overlay subdivisions provide a work scope definition which is incorporated by reference to define a specific contract obligation.

The Bid System of the invention permits full, clear and unambiguous definition of the scope of work to be bid under each contract and subcontract. By this means, all the parties involved in the various phases of the project, primarily including but not limited to, the lenders, architects, contractors, sub-contractors and owners (also referenced herein as the "client") know precisely what is required in each subcontract. The systematic linkage of the construction plans and specifications to the bids and contracts generated by the system permits the early detection and correction of errors, omissions, ambiguities or inconsistencies of the plans, thus providing a bi-directional flow of information to increase the accuracy both the contracts and the plans.

Other objects and advantages will be evident from the description, drawings and claims.

Bid System Principles

From a mathematical perspective, the Bid System and method of the invention, including the set of overlays containing identified regions mapped to specified corresponding regions of the plans and specification on a one-to-one basis, employs a system of almost-orthogonal equations, which provide the following functionality. Any such function which is non-singular, and which has one-to-one mapping point-to-point, has the property that the smaller the surface area of the region (provided the function is continuous on the region), the greater the transparency. Thus, as the area of the region specified is reduced, the degree of precision increases and the potential degree of ambiguity decreases. As the topological subdivisions of the overlays are progressively refined through the operation of the method of the invention, a mathematical limit is approached wherein the potential ambiguity tends to zero. Consequently, the mapping of overlays to plan comprises a system having the property of progressively increasing transparency as the typical size of the subdivisions is reduced.

Thus, under the system and method of the invention, the size and boundary location of each subdivision may be selected to obtain the degree of specificity needed to completely identify and define the scope of work for any given element of the project work. Accordingly, it is possible to use the Bid System of the invention to identify, without ambiguity, the entirety of the scope of work called out in the plans and specification. In other words, it is possible to use the Bid System to specify 100% of the scope of work of the project, not just 99.9%. In practical terms, this means that the Bid System may be readily adapted to any specialty work or category of services or components of the construction project, both routine and non-routine in nature, and still obtain complete specificity of the scope of work required under any subcontract.

The method of the invention is preferably carried out by means of a computer-based digital Bid System including a conventional computer system (with conventional processors, memory, input/output and display devices) which is suitably programmed to carry out the present inventive method. However, the functional steps of the method of the Bid System of the invention may also be carried out by a combination of manual and computer operations.

The following description will focus on application of the method to sub-contractor bidding, it being understood that the steps may also be carried out with respect to the various other project phases and requirements, including financing, permitting, management of the project during construction, and indeed, to the initial conceptual design phase.

Plans, Drawings and Specifications

The Bid System is compatible with conventional architectural, engineering and construction plans, drawings and specifications currently used in construction projects. The Bid System is also compatible with conventional CAD systems, and the system includes means for file import, export and conversion. The primary input to the Bid System is preferably a complete set of conventional architectural or construction drawings, preferably including any engineering notes, bills of materials, custom features, items or designs, or other specifications provided with the drawings (these documents may be referred to collectively herein as the "drawings", "plans" or "plans and specifications").

The plans may be scanned in from paper sheets by a conventional digitizing scanner so as to create a computer-readable digital data file. The term "plan sheets" may be used to denote herein either the paper or electronic image form of the drawings, as the context indicates. Alternatively the plans may be imported (and converted as needed) from conventional computer-readable CAD or other electronic files. Optionally, the Bid System may include a CAD module to allow the preparation, editing, correction and revision of drawings directly without additional distinct import/export/scanning operations. Regardless of the means of input, the term "plans" or "drawings" will be used herein to denote the computer-readable form of the plans or drawings, unless another meaning is indicated by the context (for example, plans and contracts printed as "hard copy").

Plan Overlays

Following input of the plans, a categorical series of virtual overlays are created as digital data for each plan sheet. Preferably, the overlay series is stored as one or more digital file(s) in computer readable medium. Each individual overlay is geometrically coordinated with and associated with a specific sheet of the plans. Each virtual overlay represents a particular category of building trade or bidding sub-contract category.

In essence, the overlay is a virtual surface, aligned coordinate with the plans, upon which plan specification information pertaining to a specific trade or bid category may be defined, extracted or refined, distinct from other plan information, for example, by enclosing pertinent plan features in closed boundaries (which can be referred to as "frames"). Thus the overlay is a representational object for segregating plan information related to a particular trade category.

The digital or virtual overlays are analogous to transparent sheets which can be superimposed on paper drawing sheets, so that subdivisions may be drawn on the overlays to mark data or drawing features mapped to specific regions or locations on the plans. For simplicity and clarity, this physical "transparency and paper" analogy will frequently be used herein to describe certain steps of the method of the invention. However, it is noted that, unless the context indicates otherwise, the steps are preferably carried out electronically using software embodiments of the Bid System invention, conventional computer means, and conventional peripheral devices, such as displays, mouse type devices, light pens, keyboards and the like, to establish pertinent information in the form of computer-readable data. The plans and overlays are preferably transmitted electronically in the Internet-based business method aspects of the invention.

The term "trade", as used herein with respect to the plan overlays and the corresponding bid categories, includes traditional building and construction trade categories. The term "trade" in this context can also include any other category of work, services or materials indicated by, or related to, the plans and specifications which the bid system operator, general contractor, architect, lender, insurer, permitting or inspecting the agency, or owner determines is advantageously assigned to a distinct work or bidding category. This can include work to be reserved to the owner or postponed to future projects. As many different categories may be established by the operator as are needed to completely bid the project.

Establishment of Overlay Subdivisions

The topological subdivision regions which refine and define the scope of work are created upon the overlays by a number of exemplary method embodiments of the invention. Regardless of the particular method or methods used to establish the overlay subdivision, each subdivision is preferably identified by a unique code and preferably also has a displayable icon associated with it. The identification code and icon ("identifiers") provide a cross-reference between the contracts and bid documents which list/display such identifiers and the overlay subdivisions which define the work to be performed.

Where a particular plan element spans more than one subdivision within an overlay (i.e., boundary-piercing elements), each such subdivision may have associated annotations defining the continuation of such element to adjacent subdivisions, In both computer display and in printed hardcopy, the overlay subdivisions may be shown as a highlighted or shaded region, and displayed or printed superimposed upon the plans. In its computer displayed form, each such subdivision may be "clickable" so that a mouse or other input device can trigger the display of associated information relating to the subdivision, such as defining coordinates, annotations, and cross-referenced contract and bid documents as described further below. Preferably the user may click to open a menu of such options, and select the desired display options.

Overlay categories may be color or pattern coded for printing and computer display, to permit convenient viewing of more than one overlay category superimposed on the plan sheet simultaneously.

Overlay Box Subdivision Embodiment

In one embodiment of the Bid System of the invention, the work described in the plans is defined by the establishment, on each relevant overlay, of a system of subdivision regions, each of which is enclosed by a user-defined closed boundary, frame, or "box", so that each such box identifies, delimits and locates on the plans a portion of the project work to be performed. Each such enclosed region or box includes within its closed boundary a finite portion of the scope of work to be bid under the particular trade contract, i.e., that enclosed work portion is accurately associated or "mapped" to the corresponding boxed regions and overlay category on the architectural drawings or construction plans. Thus, the "box" work scope definition is incorporated by reference to define a specific contract obligation.

The Bid System user or operator draws or defines "boxes" on each overlay, over each part of the respective plan sheet which corresponds to the particular subcontract category for the overlay. Each box is preferably defined by a plurality of ordered pairs of coordinates, and by lines connecting these coordinate pairs to form a closed box perimeter or boundary. The coordinate system may be centered with respect to any convenient reference point on the plan sheet, and preferably is based on a conventional rectangular coordinate grid, but other conventional coordinate systems such as radial coordinates may also be used. The boxes are not limited to any particular shape and the lines connecting the coordinate pairs are not limited to straight lines, and may be other geometrically defined curves.

However, as the term "boxes" implies, boxes composed of a plurality of straight lines defined with respect to an orthogonal coordinate system are generally preferred for simplicity, operator convenience, and consistency with conventional building plans. The scale of the coordinate system may be in arbitrary units, or may adopt the scale and units of the plans. Reference grid scales may be superimposed on the borders of the overlay for viewer convenience, in the manner of conventional street map coordinate grids.

The Bid System may optionally be applied to 3-dimensional box definitions, and the grid system can include 3-dimensional coordinates, preferably as ordered orthogonal triplets (although spherical coordinates may be used). However, since the conventional plans used in construction are generally organized as 2-dimensional representations, the 2-dimensional embodiment of the Bid System is described in detail herein.

It is preferred that the region defined by a given box of a category not overlap with another box of the same category, such as a box-within-a box. While the overlap does not prevent the job from being bid properly as long as duplication is avoided, it is desirable to have each box within a category uniquely define a plan region, so that completeness and non-duplication can be proven topologically.

Note that the operator may also preferably draw boxes over any part of a plan sheet not having work covered by the particular overlay category, and these non-category boxes ("empty boxes") may have no icon or be assigned an icon indicating the absence of work associated with a category. Optionally, an error: detection algorithm may be included to check to ensure no portion of the plans was inadvertently neglected by the operator, i.e. was not boxed. There may also be boxes defined by subtraction, i.e., a larger region minus one or more small boxes within or encroaching into portions of it. The foregoing procedure is preferably then repeated for the work category with respect to each sheet of the plans, and repeated with respect to each designated work category. Thus, preferably each sub-contract category will have an overlay with boxes for each plan sheet, and corresponding icons assigned by the bid engineer.

Once the boxes are created on each overlay sheet corresponding to a particular category, a form of contract or sub-contractor bidding agreement may then be read in from a contract forms database. Alternatively, a suitable contract form may be scanned in or imported into the Bid System. The Bid System preferably includes conventional word-processing and/or image processing software modules to permit the creation of custom contract forms or the editing of contract forms submitted by a particular owner or vendor. The contracts forms includes paragraphs or sections in which the detailed scope of work required is described with reference to the boxes.

The subdivision of the plans into overlays and boxes in the Bid System is particularly advantageous in situations where work in a given trade category is to be divided between more than one entity, which ordinarily exacerbates the risk of confusion using traditional bidding procedures. This may occur, for example, where the general contractor and a subcontractor divide a particular category of work, or if owner-supplied fixtures etc. are to be installed by a subcontractor. In these circumstances, the specifically bid, box-defined work portions serve to avoid misunderstanding as to the limits of the role of each party. Also, boxes and/or distinct overlay categories may be established to distinguish and define non-contract work or materials which are specified in the plans. Examples are work to be completed by the owner (detailed as an "owner-work" boxes), or work to omitted form the initial phase of construction (detailed as an "postponed improvement" boxes).

Alternative Exemplary Overlay Subdivision Embodiments

In addition to the overlay box subdivision embodiment, the topological overlay subdivisions which refine and define the scope of work may be created upon the overlays by a number of alternative exemplary method embodiments of the invention, described below.

Like the overlay box subdivision embodiment, each of these alternative embodiments establish in the overlay a subdivision and/or segregation of the plan information related to a bid category so as to permit linking to contracts, bids and other documents, but each includes alternative subdivision methodology. The various overlay subdivision embodiments described herein may be used alone or in combination with each other.

Object Trace Subdivision Embodiment

In an alternative embodiment of the Bid System of the invention, the work described in the plans is defined by the establishment, on each relevant overlay, of a system of trace paths covering plan elements pertinent to the corresponding trade or category. Each trace path defines a contiguous surface region of the overlay (and corresponding aligned plan sheet). Each overlay may have as many trace paths as are necessary to completely define the bid category work. Each trace path is thus a representational object on the overlay corresponding in extent and general shape to the plan element or elements.

Each trace path includes a trace centerline, which may include both straight and curved portions. The trace centerline may also be branched. The trace path also includes overlay/plan area within a pre-defined distance perpendicular to the trace centerline (trace breadth). The trace path is thus represented geometrically in the plan ordinate system by a series of contiguous line and curve segments, intersection points and trace breadth parameter.

The trace paths are preferably created by moving a pointing device (such as a mouse cursor, input stylus or other conventional computer user input device) over a display of the digitized plan sheet, so as to establish in computer memory a geometrically defined curve. The trace path method of overlay subdivision is particularly suitable for distributed kinds of plan or trade elements, such as ducting, plumbing, wiring conduits and the like. The trace path can be established quickly and intuitively for such elements. In both computer display and in printed hardcopy, the trace path may be shown as a highlighted or shaded region.

Zoom View Subdivision Embodiment

In an alternative embodiment of the Bid System of the invention, the work described in the plans is defined by the establishment of scaled or "zoom" view definitions upon the overlay. The zoom view subdivisions are similar to the subdivision boxes described above, but are not defined by a particular closed curve, but rather are represented by a center point and a geometrically defined area about the center point. For example, a zoom view may be defined as a circular area having a defined radius about the center. Alternatively the zoom view is a rectangular area of predetermined height and width about the center point.

The zoom view subdivisions are conveniently displayed or printed as enlarged views of the original plan sheet, and may be defined or scaled to fit the shape of a page print area or screen. The scale of the enlargement (corresponding to the defined radius or height/width of the zoom view) permits detailed plan information to be conveniently printed/displayed, such that the entire printed/displayed portion falls within the subdivision.

Grid Block Subdivision Embodiment

In an alternative embodiment of the Bid System of the invention, the work described in the plans is defined by the establishment a comprehensive grid of overlay blocks. The work is then defined by specifying the particular grid blocks which encompass the work to be included in the category. The size of the grid blocks is preferably standardized for all overlays linked to the plan sheet, and the standard size may be preselected to permit a desired degree of selectivity. The grid block identifiers may correspond to row and column headings, such as are typically used in maps and spreadsheets.

Functional Overlay Drawing Subdivision Embodiment

In an alternative embodiment of the Bid System of the invention, the drawing data pertaining to a work category is subdivided by extraction/segregation from the plans and insertion into the corresponding overlay. Thus the overlay, following extraction, comprises a functional subdivision drawing including the category work. Since the overlays as defined herein are representational surfaces coordinately aligned with the drawing sheets, particular drawing information may be extracted or copied to an overlay of that sheet without loss of contextual information. The data on the overlay may be matched or mapped to identical data on the plans. The overlay is linked to contracts, bids and other documents as described herein to define the scope of work of the overlay category.

In the functional drawing subdivision embodiment, as many overlay categories may be established as are needed to extract all work to be performed in the project. In addition, if reserved or non-project plan elements are extracted to an appropriate overlay category, then a summation file of the overlays for a particular plan sheet may be compiled, preferably with both plan sheet and summation in a comparable digital format. A cross correlation or comparison between the summation file and the plan sheet is preferably performed to determine that no element of the plans has been inadvertently overlooked (completeness check functionality).

The extraction of plan data to the overlay is preferably performed by conventional computer user graphical interface tools and devices, such as are conventionally employed in graphics applications. For example, drawing elements may be graphically selected, grouped and copied to a corresponding location and orientation in the overlay. The functional drawing subdivision embodiment is particularly suitable for use in connection with CAD design applications, whereby a computer-readable CAD file is the input form of the architectural plans to the Bid System computer.

The Bid System may be readily adapted by one skilled in the art to recognize and manipulate drawing elements of the CAD plans drawing as defined in any conventional CAD file format. Similarly, where a particular CAD system permits the architectural plan sheets to be compiled as a series of drawing layers, the bid system subdivision process may include selecting one or more layers of the CAD file, importing the layer to the overlay file, and performing additional selection and editing, if needed, to limit the data elements in the overlay to those relevant to the corresponding trade category.

Linkage of Overlays to Contracts, Bids and Project Documents

The Bid System can generate forms of contract or bids, and update, archive and revise the contracts throughout the various stages of bidding and project work. The terms "contract" and "bid" as used herein refer to such sequential stages or versions of a contract document, even though the legal nature and significance of the document typically changes as the bidding and subcontracting process proceeds. At the outset, the "contract" or "bid" may in fact be simply a non-binding invitation to subcontractors to make offers on the defined portion of the project or work. Later when priced and submitted by the subcontractor, the "contract" or "bid" may become an offer. Finally when accepted by the general contractor and owner, the "contract" may become a legal obligation to perform work at the bid price. The particular legal nature indicated by the terms "contract" and "bid" is to be interpreted in light of the context and project stage.

The description of the bid contract generation method herein uses as an example the Box Overlay Subdivision Embodiment described above, but the method applies equally to the alternative overlay subdivision embodiments. The operator links each paragraph or section to the corresponding parts of all the drawings by listing next to each, the appropriate icons on each box of each drawing overlay (assigned in the above paragraph). In the electronic form of these documents, the icons may include hyperlinks for easy viewing and cross-reference between the drawing and corresponding contract portions. The icon may include a distinctive and easily recognizable logo or symbol in combination with box reference codes which is easy to distinguish from conventional architectural elements and notations of the plans. If desired, different icon logos or symbols may selected to be indicative of a particular category or trade of the box.

The complete subcontract with icons, the drawings, and the overlays can then be printed out for review by the client and/or architect, and any necessary corrections made by the operator using the Bid System. In general, the printed form of both plans and contracts will be referred to herein as "hard copy". Any non-category or empty boxes can also be identified in the print out so that the architect and client may ensure that those areas were not simply missed by them in drawing up the contract. The process is repeated for each subcontract category.

These sub-contracts can then be printed with the drawings and overlays (the overlays may be printed on transparencies, or directly superimposed on the plan printout). In this manner, all parties can readily inspect the sub-contracts and determine exactly what is required (from looking at the same icons which appear on both the contracts and overlays). Sub-contractors can enter a price on these sub-contracts and initial or digitally sign each page, to complete a bid. The signed (or initialed) sub-contracts are saved into the system for archival purposes.

Note that the entire contract with all subcontracts, icons, and drawings and iconized overlays, can also be provided to the client (for example on a CD-ROM, or by modem download) with icons being hyperlinked for easy jumping between an overlay box on a drawing sheet, and a corresponding paragraph or section of the contract.

Change Orders and Plan Modifications

The Bid System and method is usefully and profitably used for the initial bidding stage of a construction project alone. However, the same features and functionality that lends its use to this stage, makes it very suitable for use through the entire project time line. For example, since the overlays and boxes are mapped to a pre-defined coordinate system, revised plans or sheets, if required at any project stage, may be submitted by the architect or owner without the necessity of re-drawing the boxes. The substitute sheets may be imported, and saved (preferably after archiving the previous plan version) and existing overlays may be coordinated with the substitute plan sheets. Only the specific plan revisions need to be checked to see whether new boxes need to be created, or existing boxes need to be modified. Change orders can then be generated quickly and efficiently based on revisions by the method described for initial contracts.

Bid System Service Provider

In the preferred embodiment and method of the invention, the Bid System is operated by a dedicated service provider, referred to herein generally as a Bid System Service Provider (BSSP), which provides the support, software, hardware, and trained personnel to carry out all, or selected aspects of, the method of the invention. Even more preferred the BSSP may operate the system over the Internet, this comprising of an Internet-based project management system and method.

Alternatively, the operation of the Bid System may be de-centralized to a selected degree. For example, the function of analyzing plans, creating overlays and contract/bid documents and entering corrections to these documents are alternatively performed by an architect, general contractor, owner, or other person, or by a combination of these persons operating the system sequentially or interactively (in general, the "bid engineer" or "Operator"). A BSSP may still perform a wide variety of functions even when the Operator function is carried out by another party. As discussed below in connection with the various system embodiments and alternatives, the BSSP may function to archive data, maintain database services for the benefit of other construction-oriented enterprises such as lenders, insurers, brokers, realtors, attorneys, and title companies. In addition, the BSSP preferably provides software licensing, training, technical support and consulting services to other Operator parties, such as an architectural firm, including an ongoing hotline and service support.

Project Management Information

The method of the invention may be carried out in phases during a project timeline, defining at appropriate stages the contractual obligations, scope of work and deliverables for the various persons and entities participating, such as architects, consultants, engineers, general contractors, and subcontractors. The Bid System may also include inputs and outputs from or to various entities such as building code inspectors and building control services monitoring progress on behalf of lenders. The Bid System includes defining and generating original bids and contracts, and also generating change orders which become necessary during construction. The method may also include importing data and contracts for project-related contractual services not specified in conventional architectural plans, such as waste removal, security services, and the like, followed by editing, bidding, and/or archiving these contracts within the Bid System.

The data import, interlinking, document creation, archival storage, database and communications are under control of one or more computer programs which are coded to perform the functionalities described herein.

The data import and interlinking steps of the Bid System method also may be used to import other information for project administration and monitoring purposes ("project documents"), such as progress reports; scheduling data, building inspector punch lists, and the like. The project documents can be subdivided and assigned overlays and/or icons by category in the manner described above with respect to source records. These icons can then be associated and interlinked with the corresponding finalized subcontracts. Reports or displays may then be generated to present contract information in functional association with other relevant project information.

The system and programs of the invention also provide for electronic archival storage of both the plans and the contracts at various stages of the bidding and construction process, and provides for the preparation of as-built plans and the amendment of contracts to include change orders.

Plan/Overlay/Subdivision Linked Relational Database

The operation of the Bid System method of the invention typically includes the compilation of a database (the Bid System preferably includes a relational database management system and programs) which comprises data pertaining to the plans, the overlays, and the overlay subdivisions (e.g., boxes). The data is linked to other data fields pertaining to project documents (e.g., contracts for owner, architect, contractor and subcontractors) as well as other project data such as timetables, regulatory approvals, inspections, checklists and the like.

The operation of the method of the Bid System also provides program capability for updating such data in the database on an ongoing basis through out the project timeline, and logs the history of reviews, changes, completions, communications, and the like.

Because this plan/overlay/subdivision linked database structure is relates the precise work description for each trade category (overlay/box data) to project documents and project status, this database is singularly useful for other project related processes, such as builder's control, project cost accounting, lender's controls, and the like. As many additional data fields may be created in the database as are needed to relate the project data to these industrial requirements and controlled and secure data access may be provided to third parties needing access to the database.

For example, a construction lender may access database fields that relate the project budget to the contract cost, preferably on an overlay-by-overlay and box-by-box basis. These database fields may be correlated with fields which log builder's control reports and building inspection check-offs, also on a an overlay-by-overlay and box-by-box basis. This database structure thus can give the lender exceptionally precise confirmation of the expenditure of loan proceeds and the completion of project milestones.

Electronic Bidding

The Bid System also permits fully electronic bidding, and may include means whereby suitably equipped subcontractors may view the contracts as computer-readable downloads, enter prices and other information, and submit bids by disk, modem, network or other remote linkage (preferably with conventional electronic communication security and verification provisions). The accepted bids may then be printed, initialed, signed, and archived. In a electronic-bidding embodiment of the Bid System, plan features or fixtures within a box may be highlighted and hyperlinked to footnotes, bills of materials, checklists or other boxes (as with "box piercing" items). These enhancements may also be included in embodiments for use with "hard copy" bidding, for use in internal error checking and operator convenience.

Internet Embodiments of the Bid System Method and Software

Internet access and connectivity may be included in a number of ways as an element of the Bid System of the invention. Internet embodiments of the Bid System preferably are centered on a Bid System Service Provider (BSSP) which operates a proprietary website. The inclusion of Internet functionality may be integrated with the Bid System operation to various selected and differing depths or degrees, and such integration may be phased in time, as the BSSP becomes progressively established as a business. In addition, the functional differences in the exemplary Internet embodiments described below are not mandatory, a selected features and functions described in reference to one embodiment may optionally be including in another.

In addition, many of the BSSP functions described below with respect to Internet-based embodiments are equally valuable when included in off-net Bid System embodiments.

First, support and marketing Internet embodiment. In a first Internet embodiment of the Bid System of the invention, an Internet website may be created and operated by the preferred Bid System Service Provider (BSSP) to provide a range of business support and marketing functions, complementing the off-net operations of the Bid System. The BSSP website preferably comprises the following functions and features: Description of services provided by the company;

a description of BSSP executives and their credentials; a contact list of BSSP staff with e-mail addresses and phone numbers; A list of testimonials from satisfied users; and a list of press releases about the BSSP. The BSSP website may also support a partnership or affiliate program to solicit strategic alliances and companies that have interest in partnering with Bid System Service Provider (BSSP); may be used to solicit applicants for job openings at Bid System Service Provider (BSSP); and offers training on the use of the Bid System.

Second, central server remote host Internet embodiment. In a second Internet embodiment of the Bid System of the invention, in addition to the Internet support and marketing functions listed above, BSSP website may also be used to manage the interaction and workflow of the various parties using or contributing to the Bid System operation.

In the second Internet embodiment, the website-based operation management function of this second Internet embodiment may comprise a referral service oriented to such parties, in effect to create a Internet-connected community of affiliates, architects, financial institutions, contractors, insurance companies and building control groups. Such parties may enter into contractual or service relationships related to the Bid System operation, and also may provide advertising support for BSSP.

The website may host on-line training, demonstrations, tutorials and technical support for the Bid System software for the above parties.

The website-based workflow management function of the second Internet embodiment preferably includes a BSSP server-based process to link, on a project-wide basis, the parties involved in the operation of the Bid System method, including: Owner/developer, Architect, Bid system service provider (BSSP), Contractor, Subcontractors; Builders control; Financial institution/lender; insurer, legal services, accounting services, engineering, and Other interested party (e.g., regulatory body, bankruptcy receiver).

The functions carried out through the Internet connectivity may include: submitting and sharing documents; submitting and reviewing bids; distribution of contracts; determining status of a given project; initiating loans; payout and lien management and the like.

In the second Internet embodiment, the system is preferably operated as a central remote host system, i.e., the software elements are principally or wholly resident on the BSSP servers, which host on-line processes and off-net processes including archiving, communications, and service billing. Each of the other linking parties noted above may access the BSSP website by means of a conventional Internet browser software running on conventional PCs. For each project party, the BSSP via the central server may create an account, with appropriate conventional security and authentication controls, which allows that party to access particular BSSP website pages, e.g., project web pages supporting the functions of that party in the Bid System method. The central server software controls data exchange between parties by authenticating data inputs, internally processing data as appropriate to the method step, storing and archiving data, and transferring data to the account pages of other parties to the project. The website on-line connectivity may be supplemented by automatic BSSP server-generated e-mail or fax messages to the project parties, in addition to conventional communications between the parties Third, distributed-server secondary-host Internet embodiment. In a third Internet embodiment of the Bid System of the invention, the on-line operations of the Bid System are de-centralized to a selected degree. One or more Bid System parties or other business entities (secondary provider), such as an architect or project owner, may license Bid System software (typically from a BSSP as copyright owner or re-sale distributor) to permit the party to host selected Bid System functions and method steps on a webserver operated by the secondary provider.

For example, the architect may elect to operate a secondary webserver linking to an owner, a contractor, a plurality of subcontractors, and optionally building control and/or project lenders. The BSSP, in addition to licensing software elements of the Bid System of the invention, may host on-line demonstrations, tutorials, training and technical support for the Bid System software being operated by the architect. The secondary webserver may be created and operated for a particular project, or may be a continuing on-line service for a plurality of different projects.

The BSSP typically may continue to host selected centralized functions, such as long-term record archiving of project data received from the secondary host, and archived data exchange services with customers such as title companies and lenders. Preferably, the BSSP acts as an expert consultant on an as-needed basis, in which BSSP personnel interact with secondary host personnel and other parties in, for example, solving problems, reviewing work to ensure accuracy, and the like.

Auditor/consultant Internet/off-net embodiment. The Internet embodiments (as well as the off-net Bid System embodiments) may also be used to advantage in projects where initial project construction has begun without the benefit of the Bid System. For example, where the parties to a non-Bid System project have serious disputes regarding there rights and obligations related to the scope of work, (e.g. owner vs. contractor, contractor vs. subcontractor, and the like), the BSSP may be retained to retrospectively apply the Bid System method to the project, to provide an objective analysis of the project scope of work, to assist in resolution or arbitration of the dispute.

This BSSP service may also be used by parties other than the original project owner and contractor, who have financial interests in the project (e.g., a secured lender or receiver in bankruptcy), to "salvage" a project which is failing. The Bid System method in the auditor embodiment may include the appointment of substitutes for the original parties, such as a deputy contractor or deputy sub-contractor, to bid and/or complete or correct the original project work.

Context-Sensitive Query/Response Cascade for Bid System User Information

The Bid System of the invention, in both Internet and off-line embodiments, preferably includes an advanced "help" program utility to assist users in learning to use the system most efficiently and in the design phase of the project. One presently preferred system and method for this purpose is that Disclosed In The Related Application No. 60/174,989, Filed Jan. 7, 2000, Entitled "Hierarchical Context Sensitive Query/Response Cascade For Information Access System With User-Selected Query Subset".

Query/response cascade information access system and computer programs disclosed provides an information pathway for frequently asked questions by users, and further provides a system whereby the user may learn about and initiate the use of the Bid System application program. The query/response system is adaptable to both locally resident and Internet based applications of the Bid System, permits the user to rapidly order, prioritize and select the information pathway, and to follow a chain or cascade of questions and answers through a plurality of levels.

Each level of the query/response cascade presents the user with an additional opportunity to order, prioritize and select further modifications to the inquiry pathway. Furthermore, the questions at each level may be connected in the hierarchical access path to questions both lateral and above it. The questions an answers at each level may be hyperlinked to other resources, and may be linked to operational menus within the application program, thus allowing the user to directly move back and forth between the information access methodology and the application program operational methodology. The system includes a tracking/monitoring mechanism to allow a user-specific inquiry path profile to be compiled, both for customized information access system response and for other application purposes.

Any other suitable FAQ or help line programs can provide assistance to an owner or developer in designing a building for a particular site or usage.

BRIEF DESCRIPTION OF DRAWINGS

The invention is described in more detail in the accompanying drawings, in which:

FIG. 2A showing the conventional drawing, FIG. 2B showing a corresponding exemplary "doors and windows" overlay display of the Bid System of the invention, and FIG. 2C showing the overlay of FIG. 2B superimposed upon the detail view of FIG. 2A;

FIG. 3A showing the conventional drawing, FIG. 3B showing a corresponding exemplary "doors and windows" overlay display of the Bid System of the invention, and FIG. 3C showing the overlay of FIG. 3B superimposed upon the detail view of FIG. 3A;

FIG. 23 is a schematic of one embodiment of the methid of the invention as realized in an Internet-based business operation.

The Appendix, which includes:

Table 1, a logical view chart of the objects and operations depicted in FIGS. 4–20.

Figure 1:
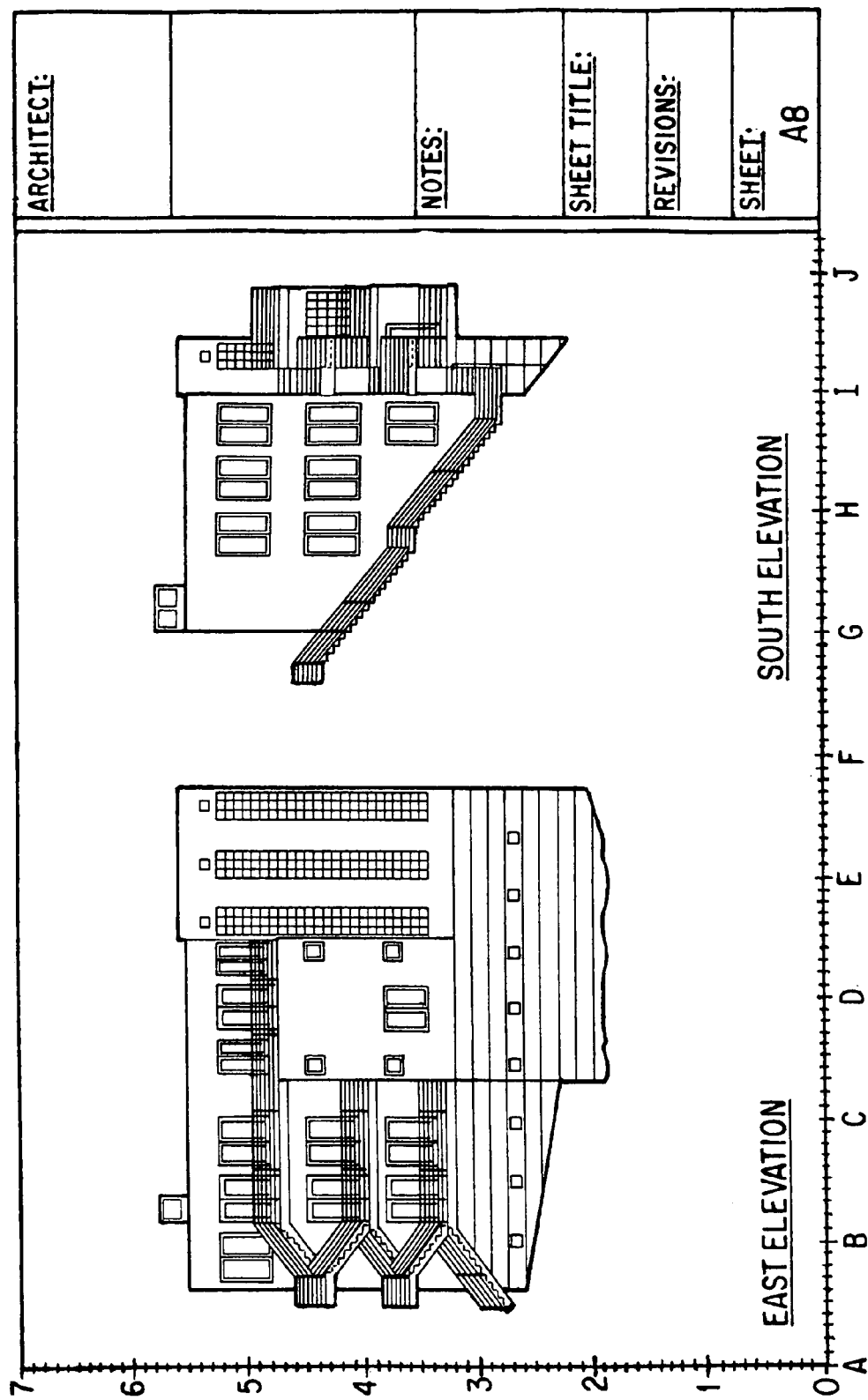
FIG. 1 is an exemplary sheet of conventional architectural plans showing a East elevation (on left hand) and a South elevation (on right hand) of a building to be constructed.

Exhibit A is an exemplary and preferred organizational chart of overlay and subcontract categories such as may be used in the Bid System of the invention; and Exhibit B is an exemplary subcontract as used in the method of the invention, showing the references or icons linked to the boxes and plans as shown in FIGS. 1–3;

DETAILED DESCRIPTION OF THE BEST MODE OF THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

FIG. 1 shows an example of a sheet of architectural plans as displayed in the Bid System of the invention, showing an East elevation (on the left) and a South elevation (on the right) of a building to be constructed using the Bid System of the invention. Note that the plans includes a coordinate grid system with the ordinates and decimally subdividing ticks displayed on the vertical and horizontal borders. In this example, decimal numeric ordinates are used in the vertical direction and decimal alphabetic ordinates are used in the horizontal direction. In this example, the alphabetic coordinates A–J are used decimally as equivalent to the numerals 0–9. This is comparable to the grid systems conventionally used in spreadsheets, with additional decimal subdivisions. Each point position on the plans may be described by a coordinate pair including a vertical coordinate and a horizontal coordinate. Thus a point grid location to three-figure precision could be described, for example, as "D.FC:5.42". Other alternative coordinate systems may be used. As described below in connection with FIG. 23, this is the type of drawing that architects 160 would submit to BSSP 400, for box, overlay, and linking services 340.

Figure 2A:
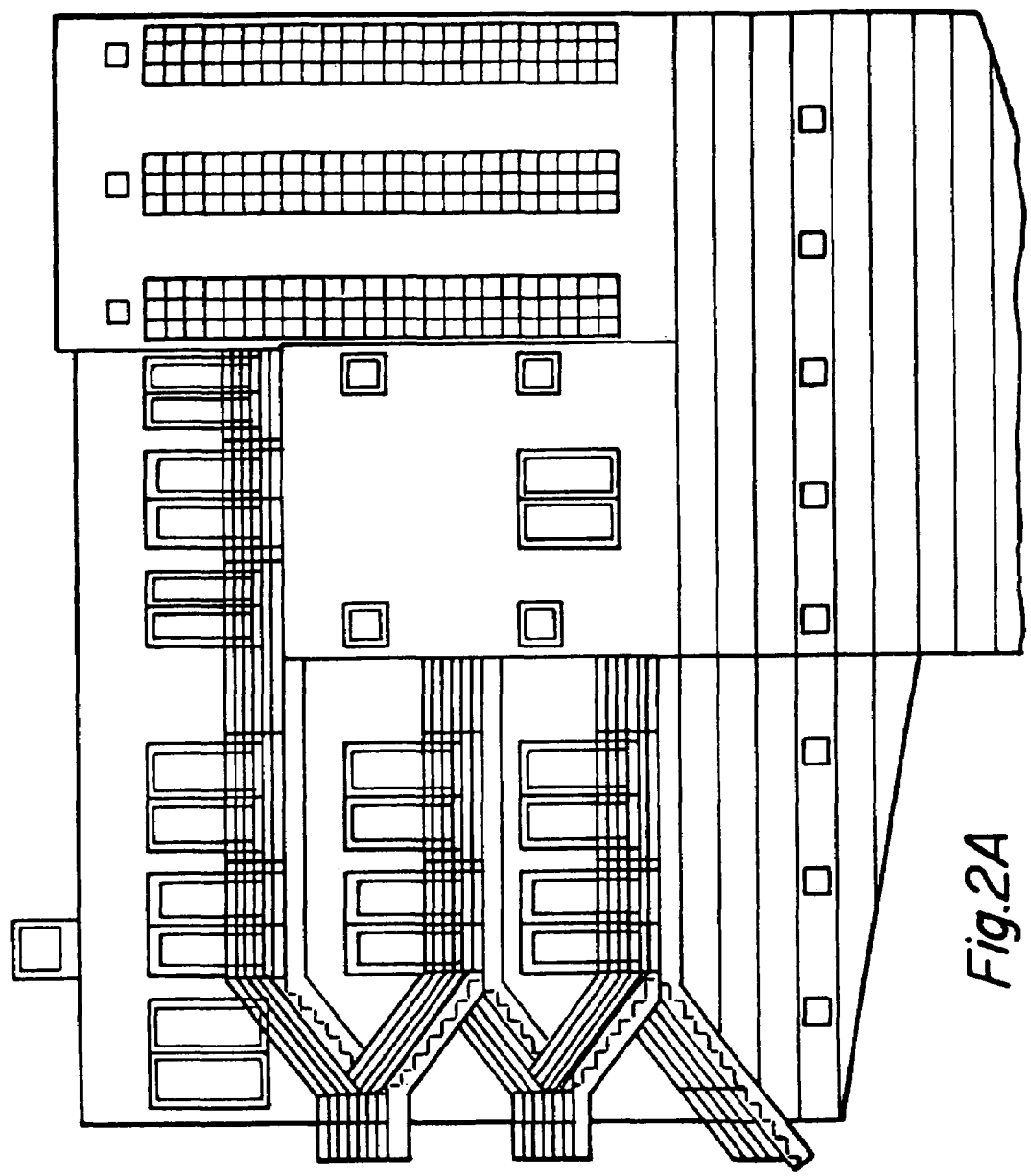
FIGS. 2A–C are each detail display views of the East elevation of the plans of FIG. 1.
Figure 2B:
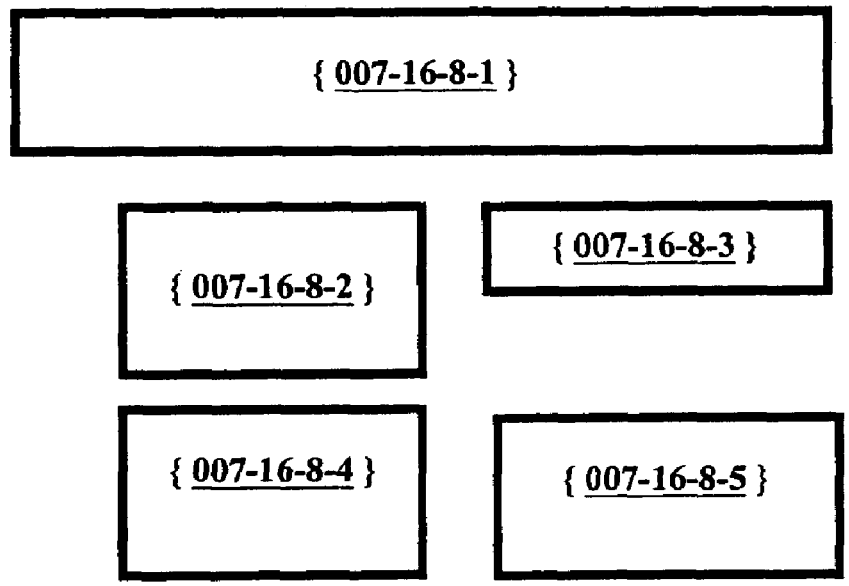
Figure 3B:
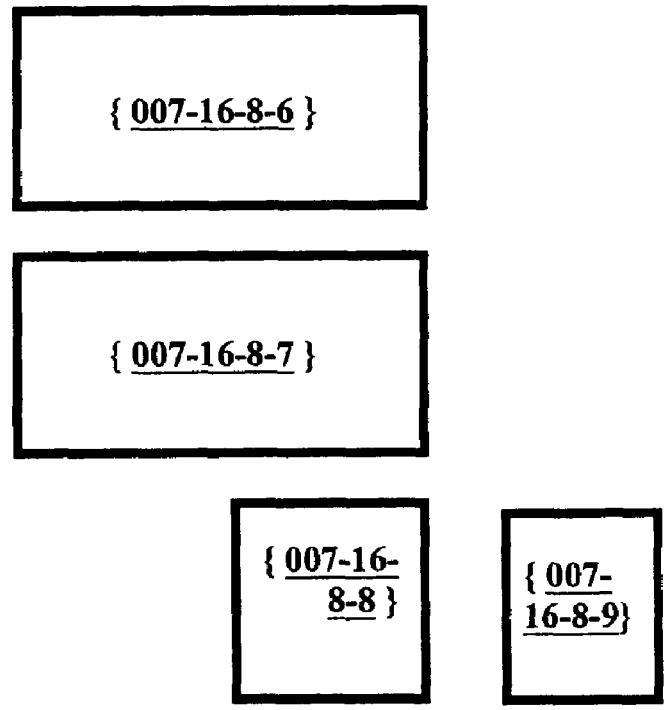
FIGS. 3A–C are each detail display views of the South elevation of the plans of FIG. 1.
Figure 2C:
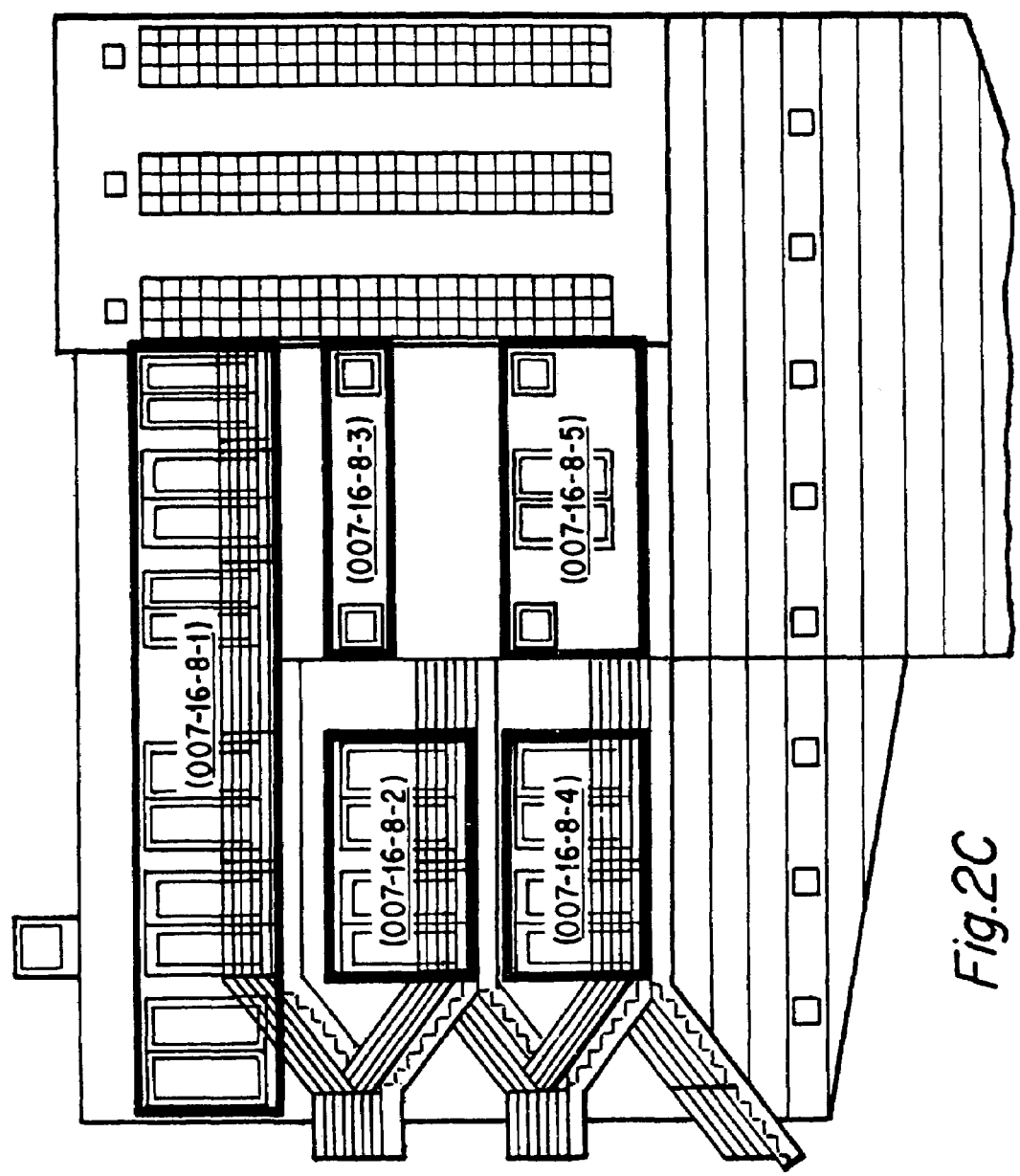
Figures 3A, 3C:
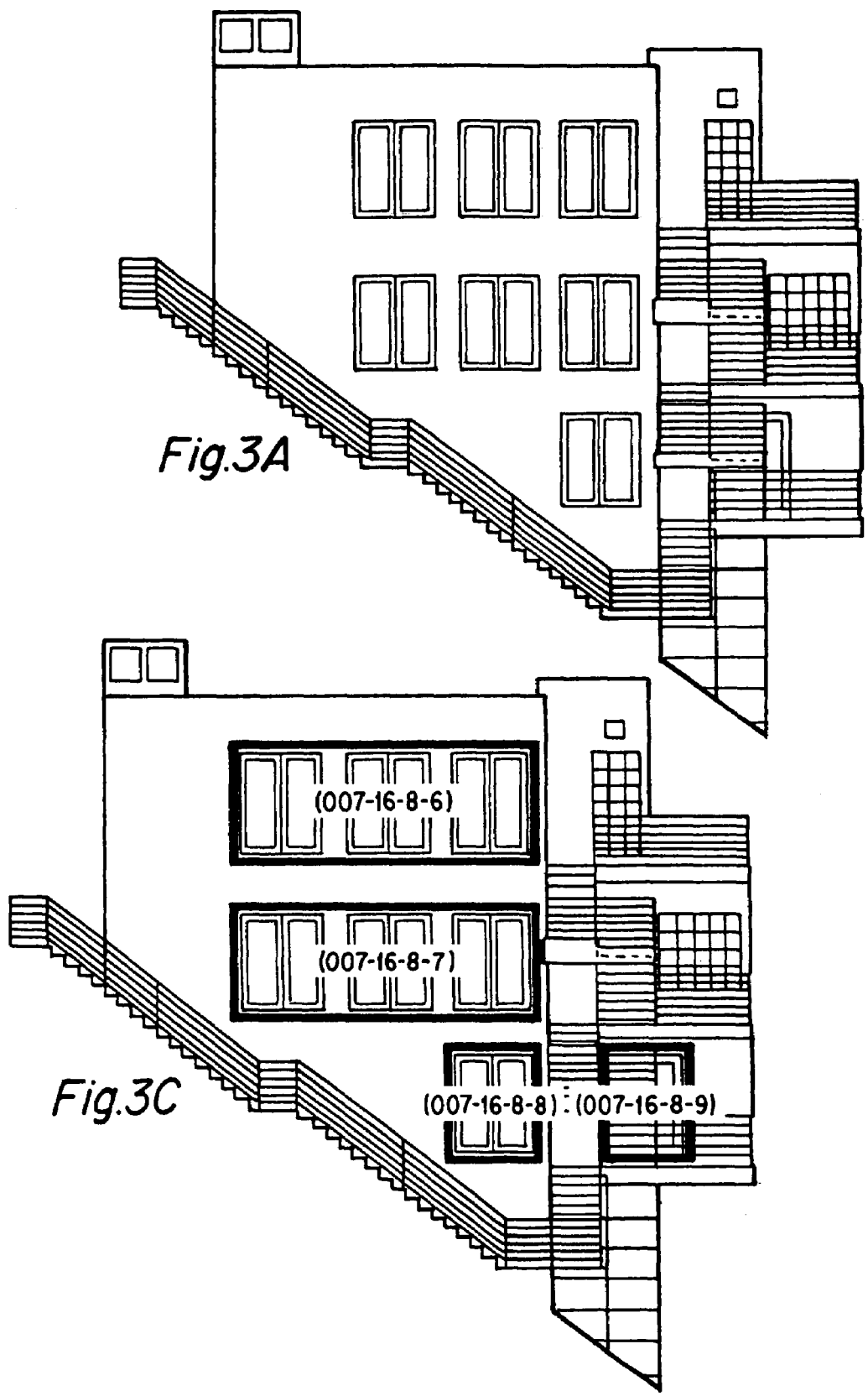

FIG. 2A is a detail display view of the East elevation of the plans of FIG. 1. FIG. 2B showing a corresponding exemplary overlay display of the Bid System of the invention for the subcontract category "door and window installation". FIG. 2C shows the overlay of FIG. 2B superimposed upon the detail view of FIG. 2A. Similarly, FIGS. 3A–C show a detail view of the South elevation of the plans of FIG. 1 (FIG. 3A); a corresponding "doors and windows" overlay display (FIG. 3B); and the overlay superimposed upon the detail view (FIG. 3C). Referring to FIG. 23, FIGS. 2A–3C thus represent the results of the BSSP services as returned to the architects 160 for inclusion in a bid package for contractors 220, lenders 600, etc.

Exhibit A of the Appendix is a organizational chart of preferred subcontract categories and subcategories which may be used in creating overlays of the Bid System of the invention. The preferred computer-based embodiment of the Bid System includes menu-based checklists to assist the operator in creating the overlays. While not all categories/subcategories shown in Exhibit A will be needed for every project, particular subcategories may be activated or deactivated from the menu list to fit the particular project plans by the computer user interface, such as by clicking subcategory "buttons" with a mouse. The operator may then create a corresponding overlay for each plan sheet related to the overlay category. The organized checklist menus thus reduces the time required for the operator to completely analyze the plans and establish the needed overlays.

As seen may be seen in Exhibit A, the example overlay of FIGS. 2 and 3 corresponds to category 007 (Framing), subcategory 16 (door and window installation). Preferably each box on the overlay is identified by a code and hyperlinked icon which includes information of overlay category/subcategory, plan sheet number and a box identifier. For example, the uppermost box shown in FIGS. 2B and 2C, is identified as "{007-16-8-1}", which represents subcontract category 7, subcategory 16 (as shown in Exhibit A), plan sheet 8 (see FIG. 1, lower right corner), box number 1.

Once the overlay is created, the operator of the Bid System draws boxes on the regions of the sheet which correspond to the work category as shown in the examples of FIGS. 2 and 3. The size of the boxes depends on the nature of the work category being described. As the work is subdivided into smaller portions (boxes of smaller size or area), the degree of specificity tends to increase.

As described above, the system of boxes constitutes a system of almost-orthogonal equations having the property that the progressive decrease in box size brings about a consequent progressive increase in the degree of transparency of the scope of work. Therefore, the operator preferably selects box sizes and shapes sufficiently small to exactly specify the work. This permits the coordinate box system to tie or link subcontract bid to the specific portions of the plan needed to exactly detail the subcontract performance obligation without ambiguity.

In the preferred method of use of the Bid System, an optimum size of box is selected wherein the box is just small enough for full transparency (completely unambiguous description of the work), without loss of information, and without unnecessarily adding complexity to the project description. The optimum size will thus depend on the nature of the overlay category and the physical elements of the plans involved. For example, excessively small subdivisions may obscure the connections or spacing between architectural elements, and create additional requirements notations and cross-references for "box piercing" elements to complete the description. In general, the optimum size will be readily apparent to the operator based on the nature of the trade category and the physical elements in the plans. For example, an overlay box to describe framing floor joists will preferably include the full length of at least two or more adjacent joists and their respective end connections, thereby depicting the center-to-center joist spacing and both end connections, without the need for "box piercing" references or notations.

In the most typical form, a box of an overlay will be of rectangular form described by contours connecting four corner points, and thus the box is defined by four coordinate pairs. The preferred computer-based Bid System includes graphic user-interface tools organized in "toolbars" to assist the operator in defining the boxes, such as the mouse button selector tools commonly used in graphic, photo-processing and CAD software applications. The selector tools preferably have selectable snap-fit features and decimal displays to allow the operator to determine the corner coordinates of the box as it is being re-sized, re-shaped, moved or rotated. Specialized tools can assist the operator in establishing non-rectangular or more complex boxes for special plan elements. The coordinate pairs defining box location and geometry are stored in computer readable files in memory devices of the computer system (refer to computer system 500 of FIG. 23).

Figure 23:
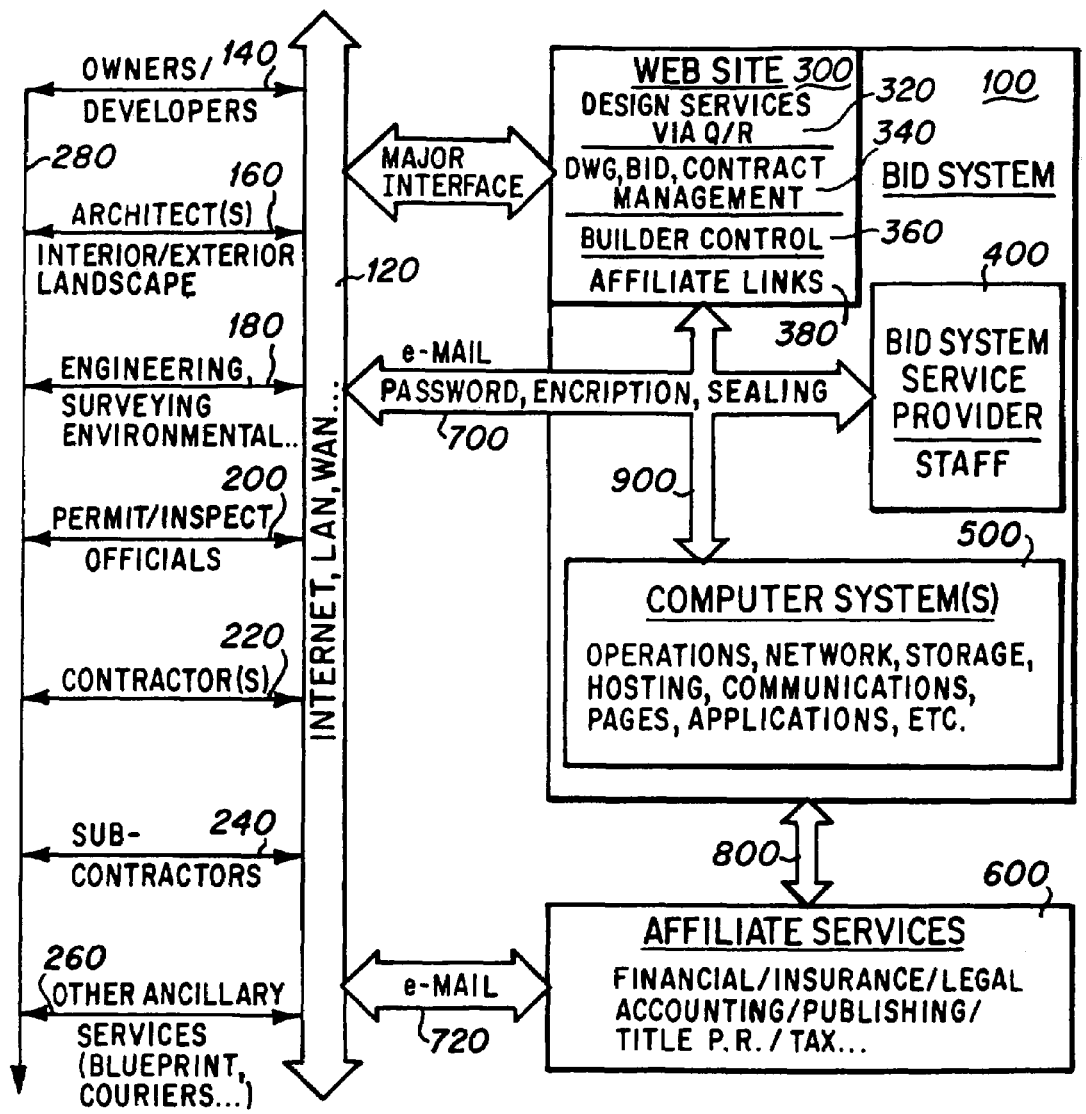
FIG. 23 is a schematic of the one embodiment of the method of the invention as realized in an Internet-based business operator.

Exhibit B shows an example of a subcontract incorporating the icons and coordinates of the boxes shown in FIGS. 2 and 3, and, referring to FIG. 23, would be provided to or made available to the selected sub-contractors 240 (and others on a need to know basis). In section 8.3 of Exhibit B, the location of the subcontract work is specified by incorporation of the pertinent boxes of the corresponding overlay, by incorporating the box icon identifiers and a listing of the coordinate pairs of each corner of the box (additional coordinates may be listed for other box shapes). For example, the first box of FIG. 2 is identified in section 8.3 of Exhibit B by its coded icon "{007-16-8-1}", the plan sheet number, and by its corner points A.FA:5.45; D.FA:5.45; D.FA:4.75 and A.FA:4.75. Note that each contract sheet preferably contains notations concerning any bid money amounts corresponding to work detailed on the particular page, and the running totals of subcontract amounts based on the preceding pages, much like check stubs in a check book. In the preferred embodiment, the electronic subcontract files may include embedded tables or spreadsheet-like objects on each page which are software-linked to similar tables or objects on both preceding and following page, so that a fully current and complete running total of subcontract amounts is automatically shown each page as bid revisions and additions are being entered into the database. Examples are shown in the upper and lower right-hand corners of each page of Exhibit B. When the finalized contracts are archived or printed as accepted, the bid amounts are preferably locked to prevent inadvertent alteration.

In the preferred computer-based embodiment of the Bid System, the operator may create an electronic file of the subcontract corresponding to a particular overlay category/subcategory. The operator may then link each box created on each plan overlay sheet corresponding to this category/subcategory to the subcontract so as to automatically insert the box description (icon, sheet number and coordinate pairs) of each such box into the subcontract. If any subsequent modification of the box geometry is necessary, the coordinates shown in the subcontract may be automatically updated. This electronic linkage minimizes operator work time and error in preparing subcontracts which incorporate the box locations as part of the subcontract work description.

In the approved and accepted subcontract, the plans and boxes are incorporated as exhibits to the subcontract and the box locations are part of the definition of the legal obligation to perform work under the contract. Thus each box is effectively incorporated into the subcontract as a discrete "deliverable". If any question or dispute arises as to the performance that portion of the subcontract, the box contains the necessary information to quickly resolve the dispute without reference to external documents. In its electronic form, the box icon in the subcontract may be hyperlinked to the plan sheet, so as to permit the corresponding portion of the plan to be displayed on the screen by clicking the subcontract icon.

Although the drawing of boxes on the overlays of the Bid System is most effectively accomplished by an operator who has experience in reading architectural plans and the construction industry, the Bid System permits an experienced architect or contractor to quickly check the operator's work and enter corrections prior to the bidding process. Furthermore, the boxes, once checked and corrected as needed, represent a permanent addition of information to the plans.

The judgment and decision making input of the operator and checking personnel during the box creation step represents a functional analysis and digestion of the plans, and is passed by interlinkage to each subcontract, and is thus available to bidding subcontractors (240 in FIG. 23) to increase the speed and accuracy of the bids. In addition, any comments or corrections that may be noted by subcontractors during the bidding process may be used to revise and refine the boxes of the relevant overlay, prior to the final acceptance of bids. Revisions or additional detail sheets may be added to the plans in an iterative interaction between the architects, contractors, sub-contractors, engineers etc., and the BSSP (see FIG. 23), if ambiguities or omission are discovered during the bidding process. These additional or corrected sheets can then be imported, new overlays created if needed, and the boxes edited or added as required. These plan enhancements, clarifications and corrections can then be interlinked to create revised versions of the relevant bid contracts.

Stated another way, the category/box/overlay system adds information of contract work scope to the plans, while at the same time, the icons and coordinates (and preferably hyperlinks, in the electronic form of the contract) effectively add information to the contract, well beyond that which would be contained in conventional verbal work descriptions. Thus, the interlinkage of plans and contracts as embodied in the Bid System of the invention creates a bi-directional information flow between the plans database and the contracts database.

In addition to linkage of plans to contracts, an icon may be created and associated with another imported project source record other than a drawing ("source record"), such as bill of materials; engineer's notes; and the like. These are thus interlinked and incorporated into bids and contracts. This procedure may be used to further specify contract or subcontract deliverables or to incorporate pertinent non-drawing project information into the contracts. This may in general be achieved by the same steps as the subdivision and interlinkage of the plans as described above. The source record may be identified by assigning one or more "sheet" numbers to that source. An overlay for each relevant category may be created for the record, identifying sub-portions by boxes and associating icons. Data may also be subdivided within the source record by linkage of the icon to one or more intrinsic internal record divisions, such as numbered sections, subsections or part numbers, or by linkage of the an icon to superimposed references system, such as page and line number ranges within the record. These source record icons can then be interlinked to the corresponding contract document.

The preferred Bid System of the invention may also include interface with builder's control services ("builder's control") monitoring the project on behalf of lenders (see FIG. 23, item 360 and associated description below). Contracts and attachments may be output for their use, and reports or confirmations may be input, logged and archived. In addition, electronic copies of the completed plans, overlays, agreements, notes and subcontracts ("plan and bid documentation") may be provided for use by builder's control staff, for example in compact disk format viewable on a laptop computer at the project site. Comments and verification by the builder's control staff regarding the as-built completeness and correctness of the project work can be incorporated into the archive copy of the plan and bid documentation. Incorporation of the builder's control verifications adds greatly to the information content of the plan and bid documentation, and are another example of the bi-directional flow of information in the Bid System, preferably Internet-based as described below with reference to FIG. 23. As records of the project history, the builder's control verifications may be more complete and meaningful than, for example, building inspectors reports, since the verifications pertain both to completion and correctness of code-required work and also to completion and correctness of non-code work specified in the plans.

Optionally, the Bid System may include means to interlink boxes to additional notations or footnotes by footnote numbers and/or hyperlinks. The operator can create separately stored footnotes, such as additional checklists pertinent to a particular box or series or boxes; and associate the footnotes with the icons of the box. The footnotes can contain comments added at each stage of the project and Bid System operation. If desired, footnotes can also be interlinked and incorporated into contracts and subcontracts. An item of work of the box category may "pierce" the box, as when an extended continuous member spans more than one box, such as a beam, pipe, conduit or the like. It is desirable to create a notation linked to each of the boxes noting this item of work, so it is clear that the bid item relates to more than one box.

The Bid System includes means and method to create addendum sheets for recording and circulating requests for clarification from owner, contractor, and/or subcontractors, and for response by the architect with clarifying notes and/or plan revisions. These addendum sheets, when reviewed and approved, may become permanent revisions to the plans and may be incorporated as revisions of the relevant contracts, by importing the addendum sheets into the Bid System, revising the plans, overlay and boxes, and revising the links and references in the contracts, as needed.

The Bid System optionally and preferably includes menu-driven prompts and templates suitable for creating checklists for particular trade categories. In this manner the Bid System and method can provide added value to the conventional plans, and assist the operator in the process of generation the overlays and boxes. The Bid System operator will typically approach the step of drawing boxes in a manner which influenced by the trade category involved, and the degree of subdivision will generally reflect this, as shown in the following examples:

For example, a framing contract will typically address a large number of pieces and substructures throughout, and thus benefit from the creation of a comparatively large number of boxes. Since the exterior walls are often laid out and erected first, the operator may put boxes on each elevation plan of exterior walls, followed by interior walls. Additional boxes may be applied to framing details such as doors, windows, archways, stairs, balconies, and the like. Likewise boxes may be drawn to isolate special hardware or other structural elements for clarity.

As another example, roofing contract work will typically address a single or few large continuous surfaces, although the Bid System the operator may determine that various structural portions of the roof will be most precisely described by being isolated in individual boxes, such as a roof ridge detail, a roof-wall junction, a chimney junction, a flat portion using different materials versus a peaked portion, and the like. In this process of subdividing the plans into functionally and structurally cohesive portions, the tasks required in doing the work become progressively more clear.

As another example, electrical contract work may typically be best defined by subdividing the plans into rooms, and including a checklist of hardware specific to each room, with additional boxes to show elements such as conduits, service panels, and the like.

FIGS. 4 through 20 illustrate one exemplary preferred embodiment of the method of the invention, including various sub-methods and optional steps. In this example, the method is preferably carried out primarily by a professional Bid System service provider (BSSP) who works with the architect, owner, general contractor and subcontractors to administer the bid process. For simplicity and clarity, the embodiment of the Bid System shown in FIGS. 4–20 is oriented to a single computer system operating entity, the BSSP, who communicates with the other participants as needed. Other alternative embodiments support multiple users, such as interactive inputs from various persons operating machines linked over a LAN or WAN, such as the Internet. This description of FIGS. 4–20 should be read in the context of operation of the BSSP 400 in FIG. 23 providing the described services, preferably via Internet, LAN or WAN 120 for the various users (the left column 140–260 in FIG. 23) as an integrated Internet business method aspect of the invention.

FIGS. 4–20 also show certain steps related to business objectives and considerations suitable to this purpose, but do not include all optional or alternative method steps of the invention. This embodiment represents a exemplary "normal routine" of carrying out the method of the invention as computerized, and preferably Internet-based. The order of steps shown is typical, but the steps may be performed in any operative order. It is understood that, in general, each step can be further broken down into substeps involving particular conventional business, clerical, user input and computer operations which will be apparent to one of ordinary skill in the art from reading this Description and Figures. In addition, steps may be repeated on an as-needed basis for overlay, box, contract and plan revisions, clarification, and the like.

In Each of the FIGS. 4–20, the operations are shown with respect to a common time line (shown as a dashed line) extending downward from each party or database system component. Thus, the activities to carryout the method may be traced by proceeding top-to-bottom in each figure. The manual or inter-party communication operation steps are shown extending to the left of the BSSP timeline, while the computer or database operation steps are shown to the right of the BSSP timeline. Note that the computer and logic operations and database objects shown in FIGS. 4–20 are those shown in the Class diagram of FIG. 21 and also in Table 2 below. One of ordinary skill in the art will be able to code suitable software instructions to carry out the method described using conventional computer hardware, memory media and I/O devices. It should be understood that the database and computer file architecture shown is only exemplary, and a number of different conventional database protocols may be employed in creating the database of the bid system of the invention. The reference below to "logging" also preferably includes saving the document to the computer system memory 500 in FIG. 23).

Figure 4:
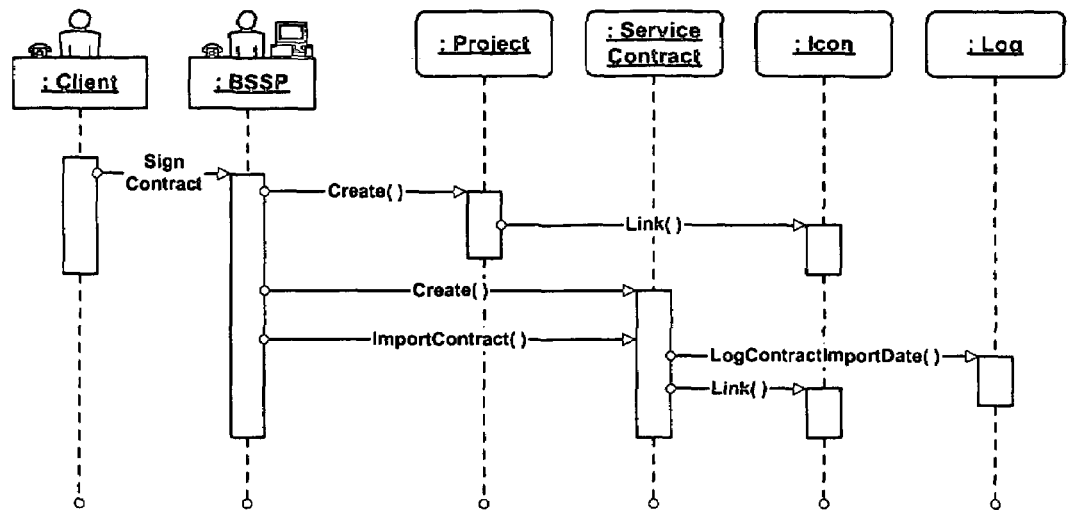
FIGS. 4 through 20 are a series of sequence diagrams which depict the steps described in Table 1 (cross referenced by figure number in the table) of a preferred and exemplary method of the invention to objects which may be coded as software using conventional object-oriented programming languages.

FIG. 4 shows the project initialization sub-method. The project owner (":Client" or owners,/developers 140 referenced in FIG. 23) enters into a bid services contract with the Bid System (100 in FIG. 23) service provider, BSSP (400 in FIG. 23). The BSSP creates a file project file (Create( )) and links this to an assigned icon (Link( )). The BSSP then imports the services contract (Create( )) into the database, and links this also to an assigned icon. The date of contract importation is logged (LogContractImportDate( )).

Figure 5:
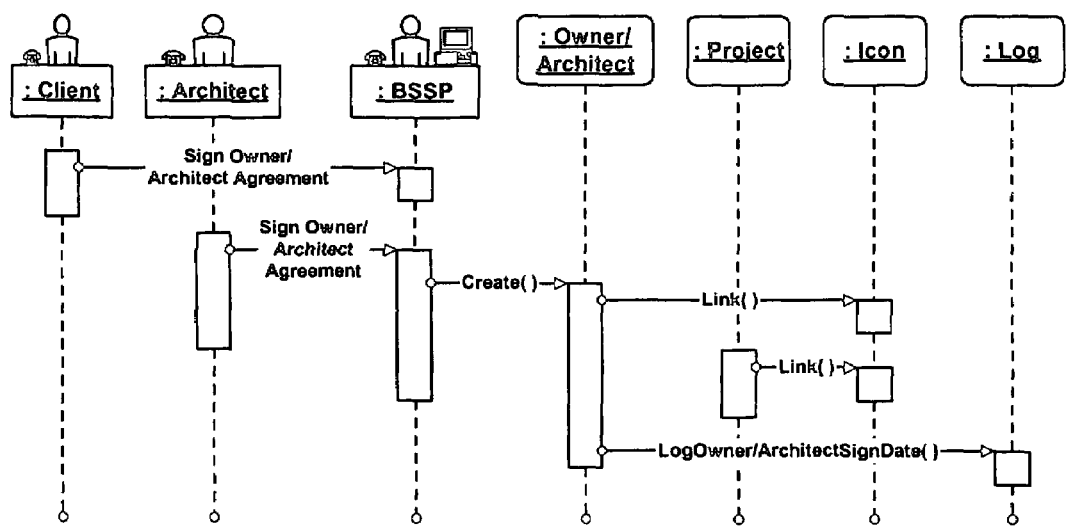

FIG. 5 shows the owner/architect agreement sub-method. In this example, the client has hired an architect to produce a complete set of architectural drawings, at least sufficient to obtain a building permit, and typically to consult in project management. Optionally, the client may provide the plans from another source, without including an architect as a project participant. This agreement details the obligations of the architect through the course of the job. After both owner and architect (160 in FIG. 23) have signed the agreement and transmitted this to the BSSP, the owner/architect contract is imported into the database system as a component of the project and the import date is logged. An icon which will link the contract to the project is assigned to the owner/architect contract.

Figure 6:
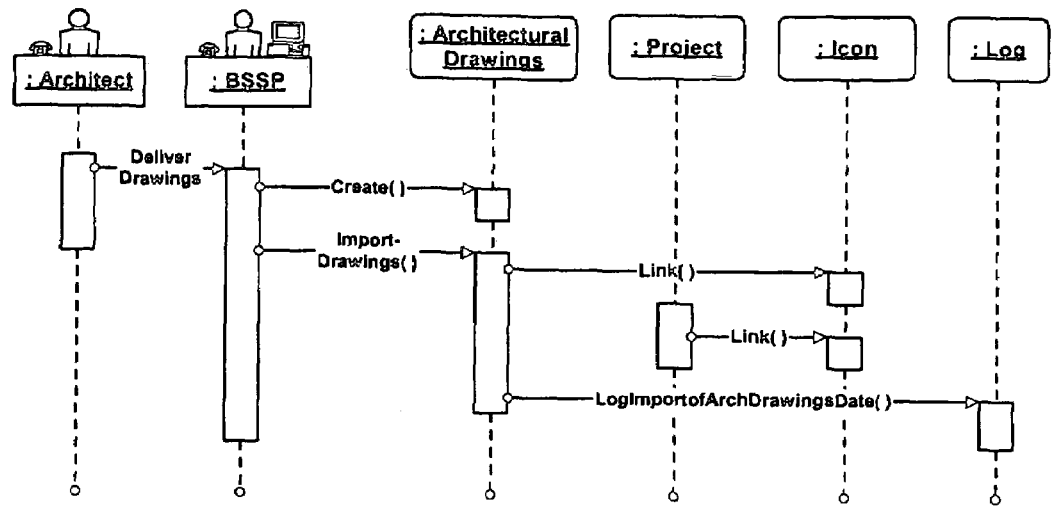

FIG. 6 shows the architectural drawings import sub-method. In this example, the architect delivers this completed set of plans to the BSSP per requirements of the owner/architect agreement, the drawings are imported (e.g., by scanning or electronic file transfer), a linking icon is assigned, and the import is logged (see also 340 in FIG. 23).

Figure 7:
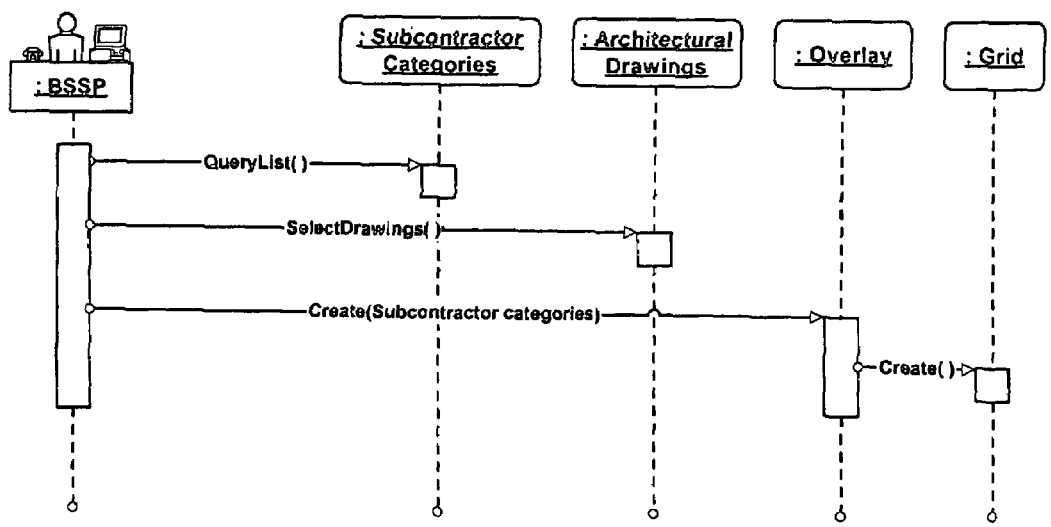

FIG. 7 shows the overlay creation sub-method. In this example, the BSSP creates overlays (with grids) based on the list of Bid System sub-contractor categories and subcategories. A list of subcategories and prompts are accessed from the database. The BSSP may query the subcategory list (and optionally create new subcategories), select a drawing sheet, create overlays and create a grid for the overlay coordinate with the drawing sheet grid.

Preferably, one overlay is created for each drawing sheet and each Bid System subcontract category relevant to the drawing sheet. The BSSP creates boxes on the overlays on each sheet of the drawings. The boxes preferably cover the entire sheet, including areas that are void of information directly related to the specific sub-category. In this way every portion of the drawing is labeled and accounted for.

Figure 8:
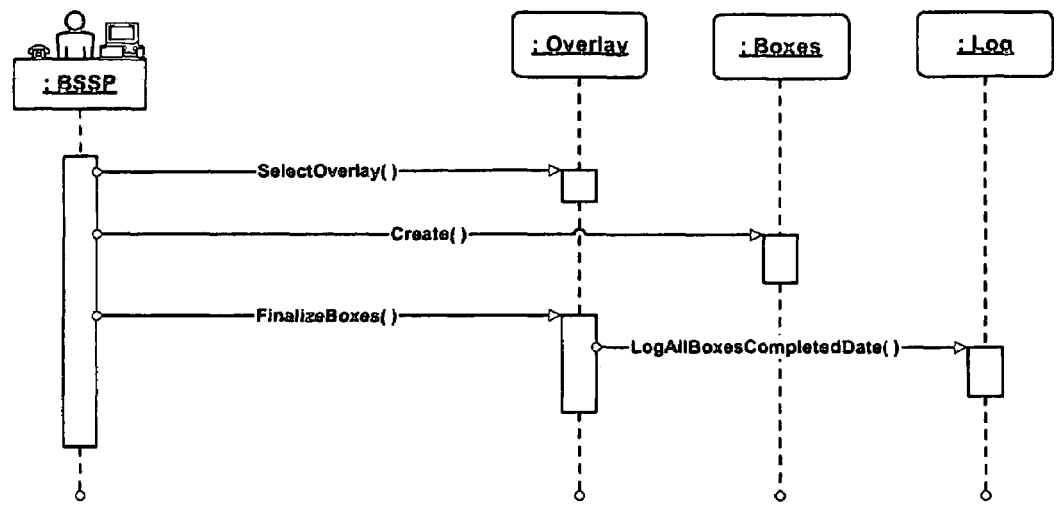

FIG. 8 shows the box creation and annotation sub-method. In this example, the BSSP creates boxes upon each overlay corresponding to and defining the position of drawing elements relevant to the overlay category/subcategory. Relevant box annotations are included, e.g., material specifications and the like, and to cross-reference and define the continuity of box-piercing elements which are also elements included in adjoining boxes. The BSSP completes entries for each box of each overlay. The date that this is completed is logged/saved.

Figure 9:
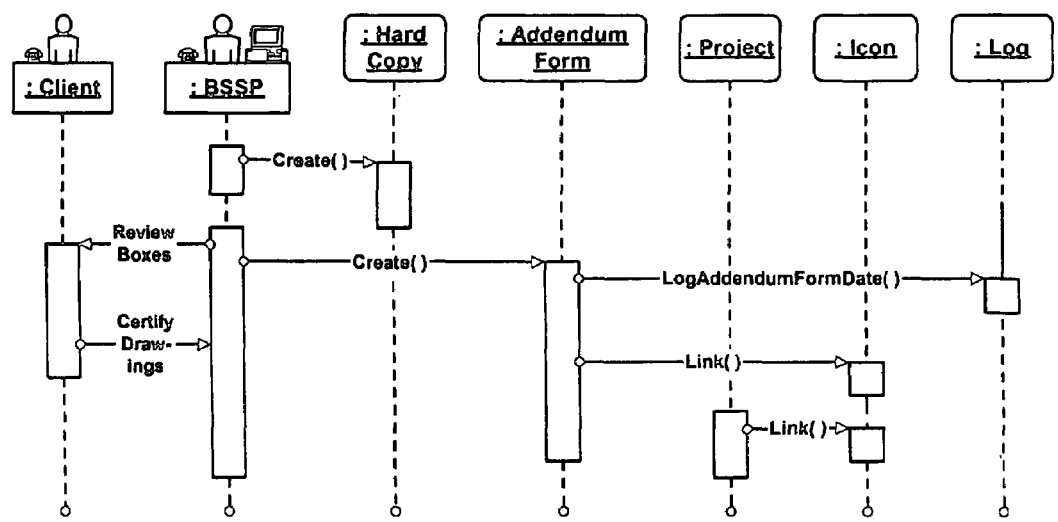

FIG. 9 shows the box/overlay review sub-method. In this example, the BSSP creates a hard copy of the overlays superimposed on plans, and transmits this to the client and/or for review. Optionally the BSSP may export an equivalent electronic file viewable by the client. Preferably, this is via a project webpage assigned and available on the website 300, in FIG. 23. The client comments and corrections to the overlays/boxes are transmitted to the BSSP. Any clarification or plan changes that the client requests of the architect and/or any changes that the client requests in the overlays and boxes may documented by the BSSP on as addendum form, which is created logged and linked in the project database. Note that the architect optionally may also review the overlays/boxes recommendations in consultation with the client at this stage (see FIG. 13 re architect plan clarifications).

Figure 10:
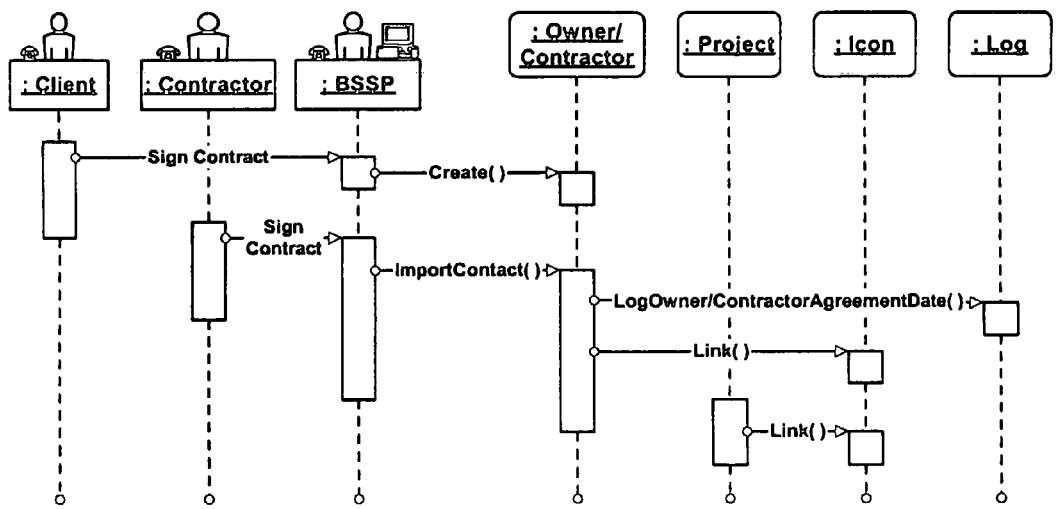

FIG. 10 shows the Owner/Contractor Bidding Agreement sub-method. In this example, the contractor (220 in FIG. 23) is hired by client to collect all bids for the project and an Owner/Contractor Bidding Agreement is signed by each party and transmitted to the BSSP. This contract is imported into system database, logged, saved, and a job-specific icon is attached to this agreement.

Figure 11:
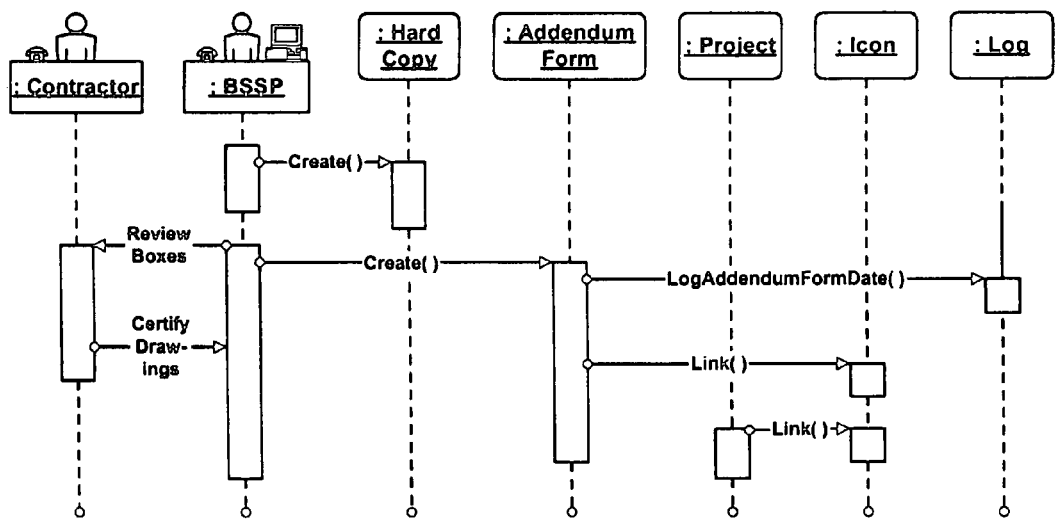

FIG. 11 shows the Contractor plans/overlays/box review sub-method. In this example, the BSSP creates a hardcopy of the plans/overlays/boxes and transmits this to the contractor for review. Any changes in the box definitions desired by the contractor or requests for clarification are transmitted to the BSSP. Any changes or clarification that the contractor requests may documented by the BSSP on as addendum form, which is created logged and linked in the project database. Additionally and optionally, the contractor requests may be reviewed and approved by the client and/or architect at this stage.

Figure 12:
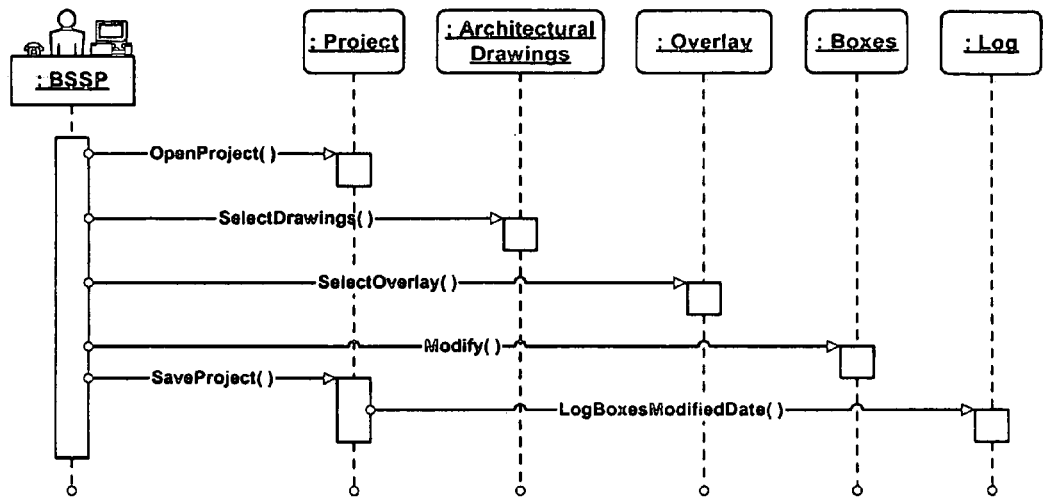

FIG. 12 shows the box and overlay edit and modification sub-method. In this example, the BSSP modifies the boxes and overlays according to the client/architect/contractor review instructions, if needed.

Figure 13:
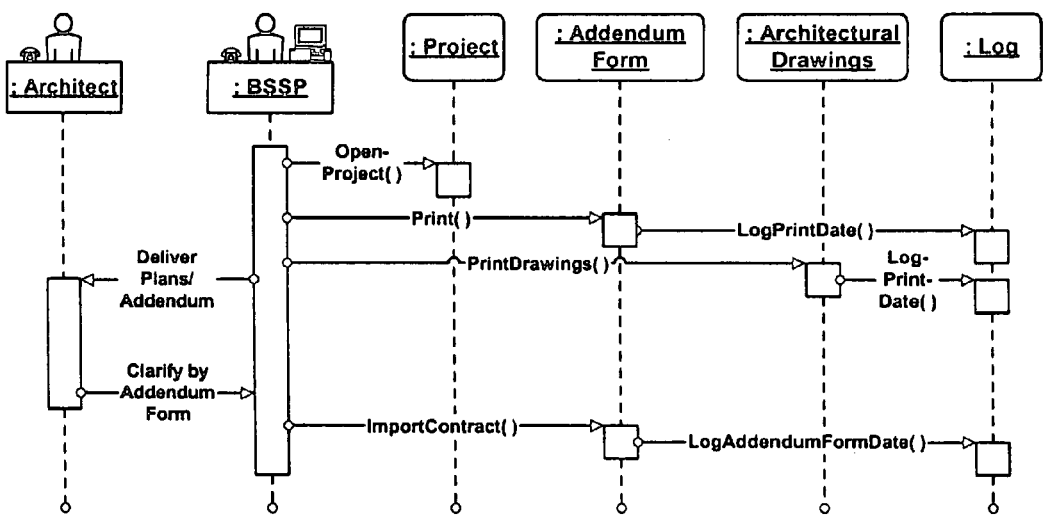

FIG. 13 shows the architect plan clarification and modification sub-method. In this example, the BSSP prints hardcopy of the plans with the addendum requests of client and contractor. The BSSP delivers plans to architect with points of clarification required by client and contractor on their respective addendum sheets. The date is logged. Architect makes clarifications to plans per addendum sheets. The architect prepares a final addendum, which becomes a permanent part of the plans (and by inclusion, part of the contract). Architect returns amended plans and addendum to the BSSP. The architect's addendum is imported and logged by the BSSP. Note: "Addendum" is used to mean clarifications to the original plans without drawing changes (see plan modifications in FIG. 18). Optionally, the architect may make drawing corrections at this stage also.

Figure 14:
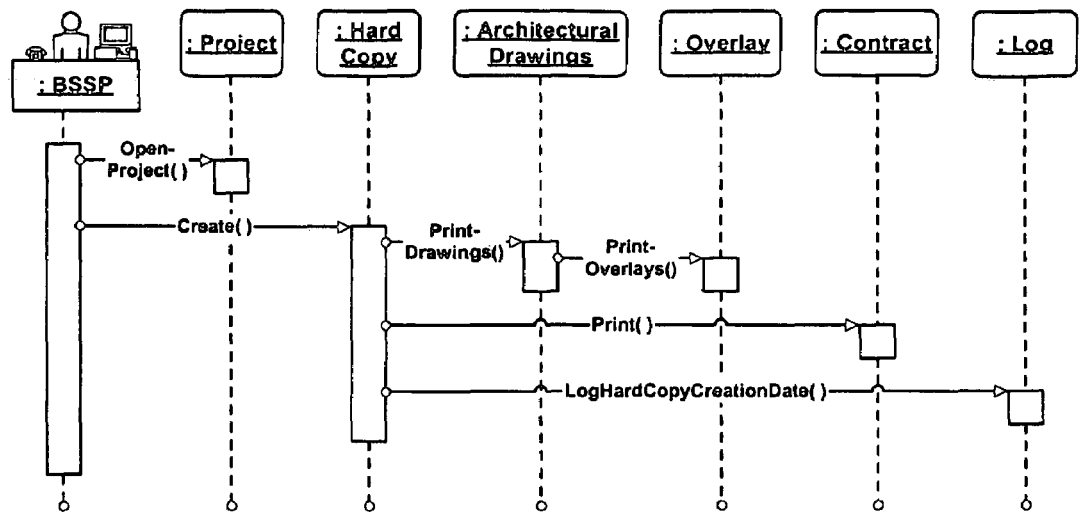

FIG. 14 shows the final plans printing sub-method. In this example, the BSSP may make adjustments to box/overlay system as needed per changes and or clarifications by Architect (see sub-method of FIG. 12). These are logged into system. A hard copy of plans with overlays is output and logged.

Figure 15:
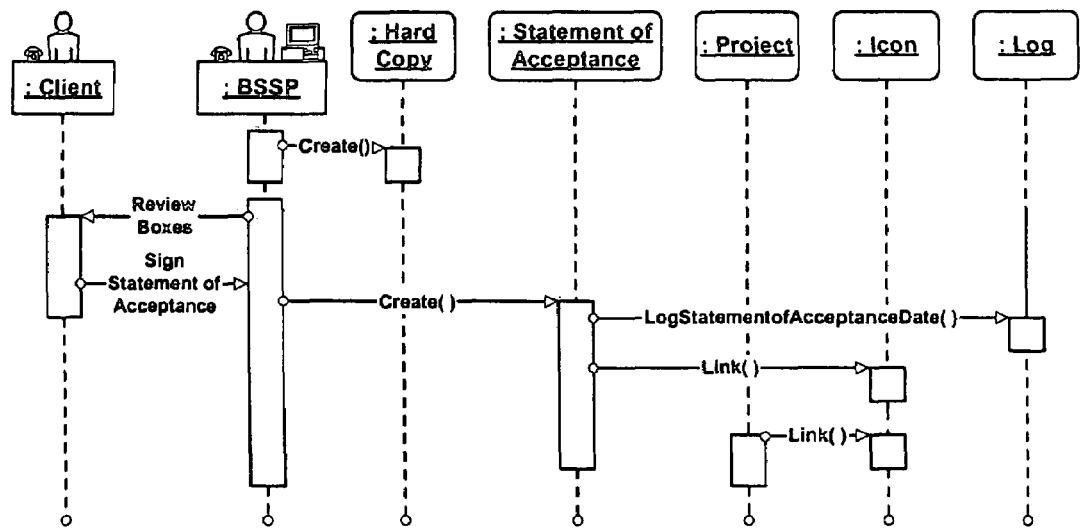

FIG. 15 shows the client final review and acceptance of the plans. In this example, the BSSP creates hardcopy of the final plans and delivers to client for review. The client reviews plans and overlays and either asks for further clarification (see FIG. 12) or signs statement of acceptance for this version of overlays and boxes, and returns to the BSSP. The acceptance is then imported logged and linked.

Figure 16:
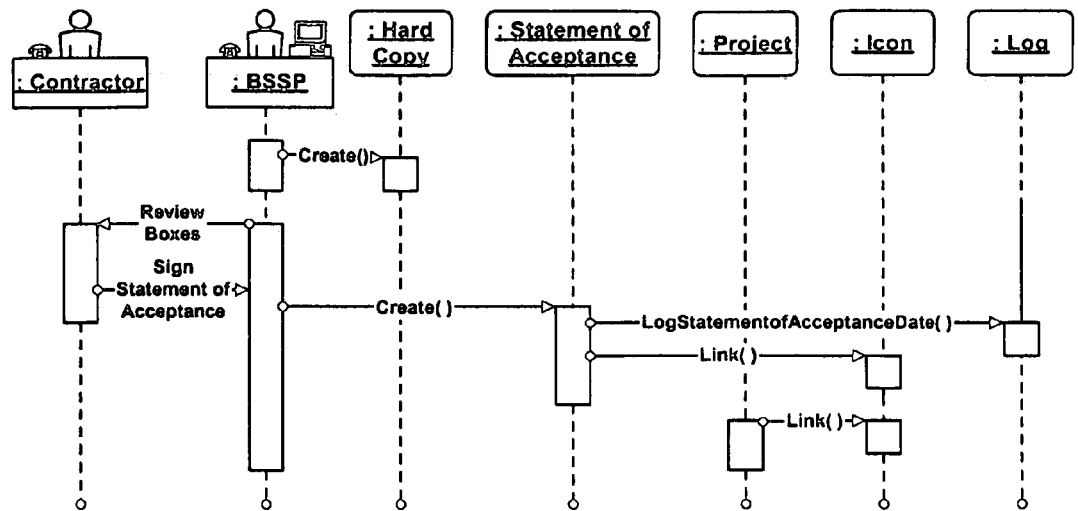

FIG. 16 shows the contractor final review and acceptance of the plans. In this example, the BSSP creates hardcopy of the final plans and delivers to contractor for review. The contractor reviews plans and overlays and either asks for further clarification (see FIG. 12) or signs statement of acceptance for this version of overlays and boxes, and returns to the BSSP. The acceptance is then imported logged and linked.

Figure 17:
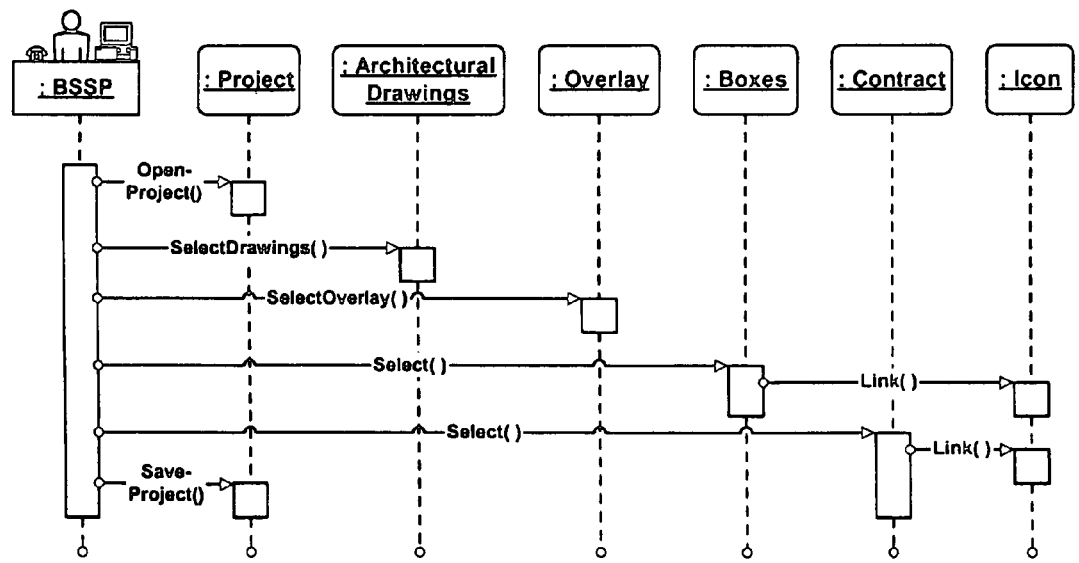

FIG. 17 shows the logging of the acceptance of client and contractor. In this example, the BSSP creates and logs the document of FIGS. 15 and 16 (reviewed and accepted addendum sheets and amended plans) into the system. The BSSP links the boxes to the contract by means of the Bid System icon. Plans with overlays and related contracts are output to hard copy.

Figure 18:
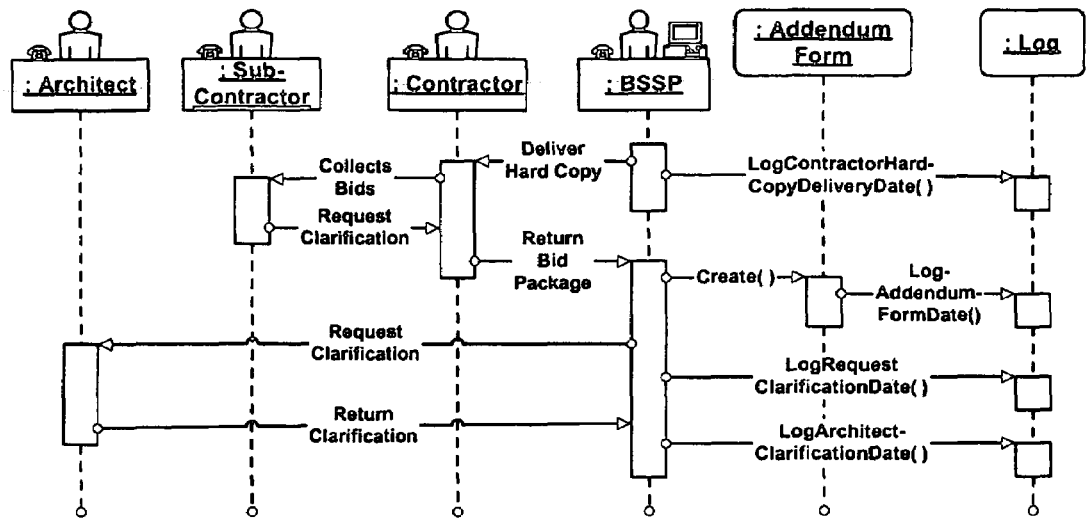

FIG. 18 shows the subcontract bid generation and distribution sub-method. In this example, the BSSP generates the subcontract bid documents, e.g., using bid system database, including the plans/overlays/boxes, subcontract templates, and project information. Contractors receive from the BSSP a package of plans with overlays and related sub-contracts. The acceptance of these items is logged into the system. The contractor undertakes the task of meeting with potential subcontractors (240 in FIG. 23), distributing the bid documents to respective subcontractors and collecting bids for each sub-contract as outlined in owner/contractor bidding agreement.

If any sub-contractor requests clarification from architect, these requests are noted on supplemental addendum form. Contractor completes initial meetings with all sub-contractors, if there are requests for clarification, all materials are returned to the BSSP, who logs this into system. At this point there are no signed bids. All items for clarification from sub-contractors are transmitted to the architect, via a Sub-contractors Addendum/Clarification Document. This date is logged into system. The architect addresses requests for clarification, makes changes on plans accordingly. Architect returns revised plans to the BSSP. This is logged into system.

The BSSP checks to see if clarifications/changes by architect require changes in box system. If definition and parameters of any boxes are changed (see FIG. 12), then all associated subcontracts may be changed also, and all links (with icon) are adjusted accordingly.

Figure 19:
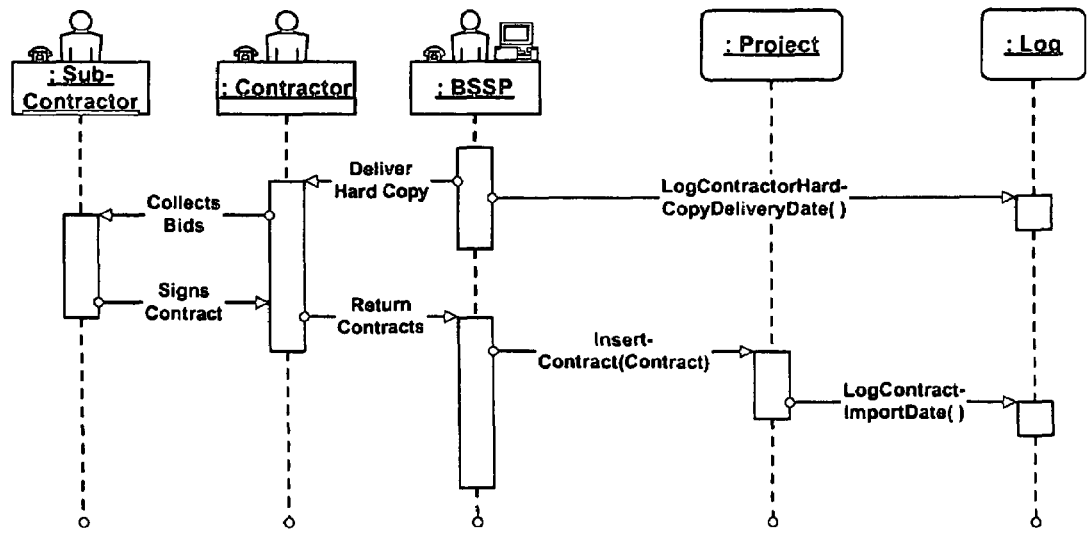

FIG. 19 shows the final subcontract bid distribution sub-method. In this example, the BSSP makes a determination that the current version of plans, contracts and overlays is complete. The BSSP then saves and logs this version into system, and outputs hard copy of plans with overlays. Revised plans/subcontracts overlays are transmitted to contractor and the date is logged into system. The contractor in turn transmits the plans/subcontracts to subcontractors to obtain signature from sub-contractors for all subcontracts. The contractor returns signed subcontracts to the BSSP, and this date is logged. The signed subcontracts are preferably scanned into system database by the BSSP as project records.

Figure 20:
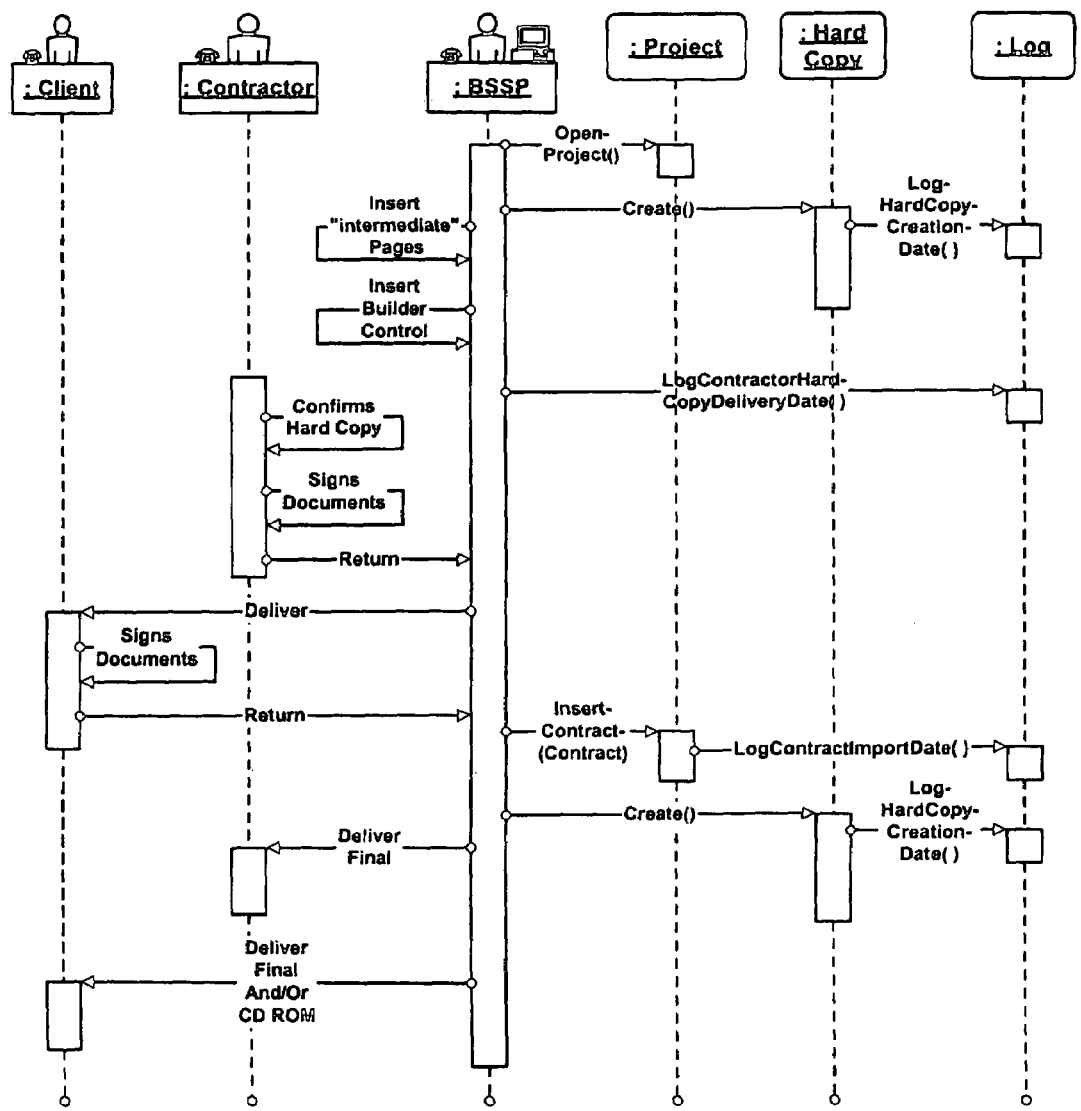

FIG. 20 shows the final contract review and confirmation sub-method. In this example, the BSSP generates hard copy of all subcontracts, along with inserted copies of "intermediate" pages, as defined in Owner/Contractor Agreement. In this phase, builder's control provisions may also be inserted per the Owner/Contractor Agreement. These delineate the timing and sequence of the interaction between the Builder's Control and the Contractor and Builders Control and the owner. All pages are numbered in sequence, the final hard copy is transmitted to contractor, and the date is logged.

The contractor acknowledges/comments on the sequence of construction for the project in the documents. Contractor checks subcontract documents for accuracy, adds his fee to the document, and returns documents to Bid System. The date is logged. The owner and contractor review all subcontract documents, and place signatures on completed documents, and return to the BSSP.

Signed subcontract documents are logged into Bid system for archive. A hard copy of each subcontract is given to owner and contractor along with CD-ROM.

Figure 21:
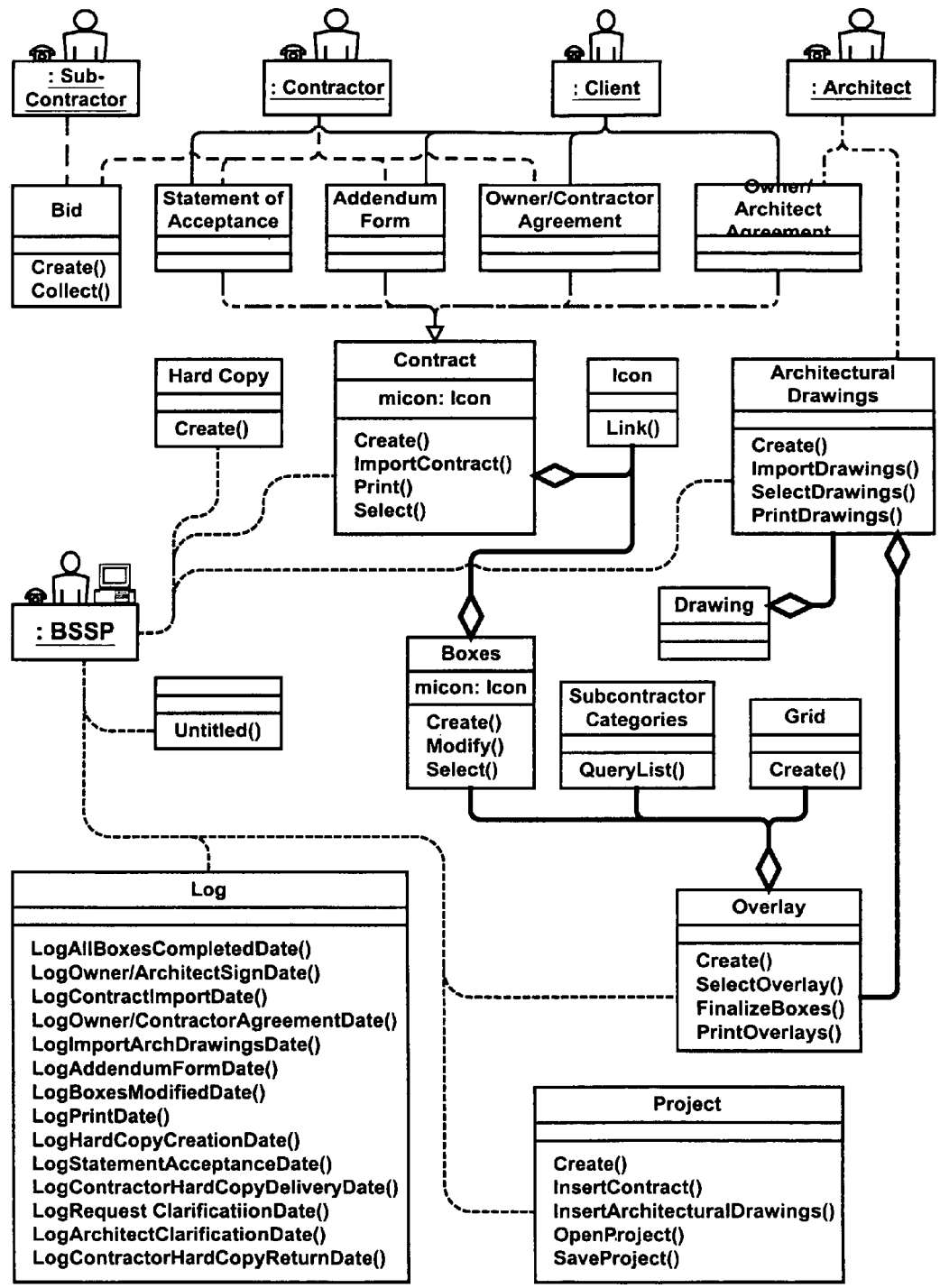
FIG. 21 is a class diagram of a preferred and exemplary embodiment of the Bid System of the invention, relating the method of the invention to the objects depicted in FIGS. 4–20.

FIG. 21 is a class diagram of a preferred and exemplary embodiment of the Bid System of the invention, which breaks down the preferred method of operation into smaller components that focus on real world objects. These exemplary objects are easily translated into computer-readable code written in conventional object-oriented programming languages, such as C++ or Java. The sequence diagrams of FIGS. 4–20, in turn tie the objects of the class diagram of FIG. 21 with the steps shown in Table 1. Table 1, included in the Appendix, is a logical view chart of the exemplary objects and operations depicted in the sequence diagrams of FIGS. 4–20 and the class diagram of FIG. 21, giving descriptions which set forth the properties of the objects.

Figure 22:
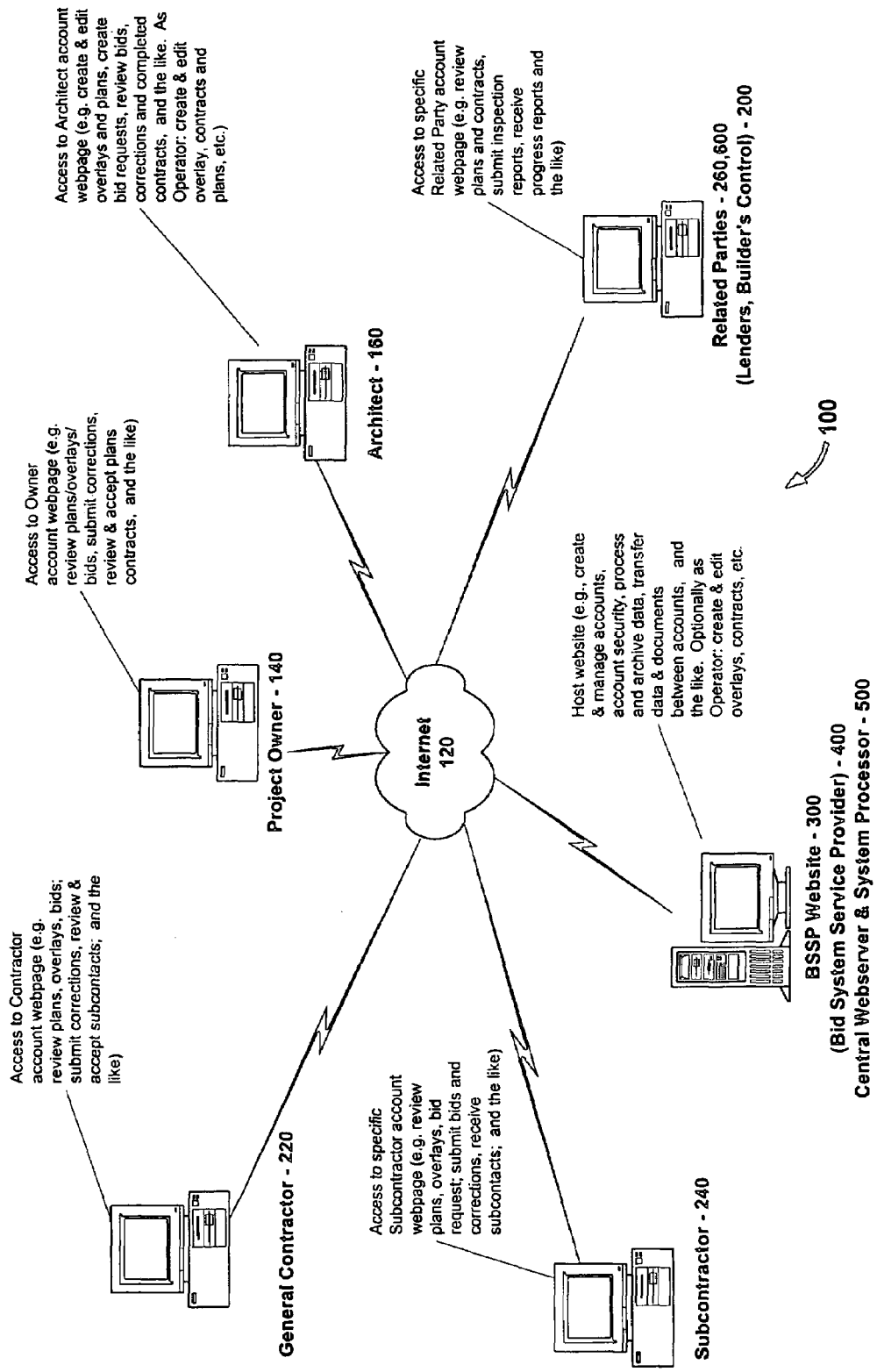
FIG. 22 is a diagram of an Internet-based Bid System of the invention, in which the Bid System is hosted on a central remote host webserver/system processor.

FIG. 22 is a diagram of a central-server remote host Internet embodiment of the Bid System 100 of the invention. In this embodiment, the transmittal of data, including plans, overlays, contracts, bids, comments, instructions, review status, edits, changes and the like is preferably via the Internet 120. The Bid System is preferably operated principally on a central remote host server 101 which is maintained and operated by the Bid System Service Provider (BSSP) 400 i.e., the software elements are principally or wholly resident on the BSSP servers 101, which host on-line processes and off-net processes. Each of the other linking parties may access the BSSP website 300 by means of a conventional Internet browser software running on conventional PCs. For each project party, the BSSP via the central server may create an account, with appropriate conventional security and authentication controls, which allows that party to access particular BSSP website pages supporting the functions of that party in the Bid System method. The website software preferably manages the interaction of each such party through links to related pages, and by response pages. The central server 101 controls data exchange between parties by authenticating data inputs, internally processing data as appropriate to the method step, storing and archiving data, and transferring data to the account pages of other parties to the project, and communications between it and the parties, and inter-parties, as needed.

The website-based workflow management functions preferably includes linking, via the BSSP website and BSSP processing functions, the interaction of at least the following parties involved in the operation of the Bid System method:

Bid System Service Provider 400: Host and manage BSSP website 300 (e.g., create & manage accounts, account security, process data with Bid System software and archive data, transfer data & documents between accounts, prepare and process billing and receipts, and the like. Optionally as Operator, create & edit overlays, contracts, etc.).

Owner/developer 160: Access to Owner account webpage (e.g. review plans/overlays/bids, submit corrections, review & accept plans contracts, and the like).

Architect 103: Access to Architect account webpage (e.g. create & edit overlays and plans, create bid requests, review bids, corrections and completed contracts, and the like. As Operator, create & edit overlay, contracts and plans, etc.).

General Contractor 220: Access to Contractor account webpage (e.g. review plans, overlays, bids; submit corrections, review & accept subcontracts; and the like).

Subcontractors 240: Access to specific Subcontractor account webpage (e.g. review plans, overlays, bid request; submit bids and corrections, receive subcontracts; and the like).

Related parties 260 (e.g., Builder's Control 200, engineers/surveyors 180, lending institutions): Access to specific Related Party account webpage (e.g. review plans and contracts, submit inspection reports, receive progress reports and the like).

The website on-line connectivity may be supplemented by automatic BSSP server-generated e-mail or fax messages to the project parties, in addition to conventional communications between the parties. Automatic e-mail messages may be used to queue parties to log-on to their respective account pages when data/documents are ready for their review or further processing. This may greatly simplify the interactions of the various parties in terms of time schedules and the like, particularly in the case of subcontractors who may not be available (do to on-site work) during typical business hours. With the increasing availability of wireless technology, Internet connectivity will be increasingly available at project site locations.

The centralized server permits the parties to avoid the expense and risks of maintaining specialized software and sensitive data on a plurality of servers. The central host website permits data transmission delays to be minimized, as each party need only transmit its specific inputs, and download only that data with is actually to be viewed by that party. Since, each party (other than BSSP) need only have available a conventional Internet capable personal computer, the range of parties who may contribute to the Bid System process is extremely broad. Due to its centralized operation by a professional service provider, the BSSP server may be economically made highly secure in terms of unauthorized access and in terms of data loss. The website on-line connectivity may be supplemented by automatic BSSP server-generated e-mail or fax messages to the project parties, in addition to conventional communications between the parties Computer System. The method of the present invention can be executed on the conventional computer hardware which use conventional operating systems by means of software running on a suitable processor (in particular, a processor of a general purpose digital computer), or by any suitable combination of hardware and software. The software can be accessed by a processor using any suitable reader device which can read the medium on which the software is stored.

One of ordinary skill in the art, having studied the Description and drawings herein, including the sequence diagrams, class diagrams and object definitions, will be able to write software code using conventional programming languages to carry out the steps of the method of the invention set forth herein.

The software may be stored on any suitable computer readable storage medium. The computer readable storage medium can include, for example: magnetic storage media such as magnetic disc (such as a floppy disc) or magnetic tape; optical storage media such as optical disc, optical tape, or machine readable bar code; solid state electronic storage devices such as random access memory (RAM) or read only memory (ROM); or any other physical device or medium employed to store a computer program. The software carries program code which, when read by the computer, causes the computer to execute any or all of the steps of the methods disclosed in this application.

INDUSTRIAL APPLICABILITY

It is evident that the improved Bid System and method of the invention have wide industrial applicability to the construction industry and other uses. In particular, this system may be additionally used for managing and administering aspects of the construction projects in addition the contract bidding operations. The method and system are suitable for use with a wide variety of network and other remote linkage means connecting multiple work stations or desktop computers to provide a distributed, interactive Bid System suitable for electronic subcontract bidding.

FIG. 23 illustrates one realization of the Internet business method aspect of the invention. The Bid Constructor System 100 is linked via Internet, LAN or WAN 120 to users, comprising one or more of: Owners/Developers 160; Engineering, Surveying Professionals 180; Permit/Inspection Services and Officials 200; Contractors 220; Sub-Contractors 240 and other Ancillary Service Providers 260. These users can also interact among themselves via the Internet or by other conventional means 280, e.g., mail, courier, direct e-mail, face to face meetings, telephone, fax, etc. As described in detail above, the bulk of the contacts are between the owners/developers, architects, permit and inspection service officials, contractors and subcontractors, and their major interface for the bid/constructor services is via the system web site 300.

In the Internet-based business method, the owners/developers 140 access web site 300 to acquaint themselves with the services and to receive a services engagement contract with the Bid System operator. Upon acceptance, which is preferably electronic, the owners/developers then select an appropriate service from the site map. In an important option, the initial access is to the design assistance services pages 320. Via the query/response question chain program described in more detail in co-pending application 60/174, 989, filed Jan. 7, 2000, the disclosure of which is incorporated by reference herein, or other suitable, commercially available interview/selection system, such as a library of home designs in a relational database searchable by one or more selected requirements profiles, the owners/developers can determine their preferences for a design for a particular property, and the related construction requirements for that design. This is particularly useful in cases in which the owner/developer does not have a precise idea in mind for the property, e.g., property owners wanting to build their "dream home", which may be vague or incomplete in important respects in one or more substantive aspects. The results are communicated to the owners/developers 140, e.g., by download, e-mail, hard copy, etc., and if so designated, to their architects 160.

The results at this stage, and indeed, at each step are saved for future access in a particular client user/project file by unique identifier in archive memory in the computer system 500 of the bid system 100. The arrows 900 schematically indicate the linked aspect of the computer system and represents the transfer of data, images, text, etc., in the bid system 100. For example, the computer system 500 includes web and/or network servers for rendering, framing, linking, upload and download of pages, associated user commands and responses, etc., in the conventional manner. It also encompasses the internal transfer of the saved client user/ project file documents, and the functions of the BSSP staff 400 working on their workstations on electronic data entry, document creation and processing, communications, etc.

In the next step, the owners/developers collaborate directly 280 or via Internet, LAN or WAN 120 with their architects on designing the project, including generation of the drawings and specifications. Employing the Drawing, Bid and Contract Management services 340 of the site 300, the Architect submits the drawings and specifications to the bid system 100. This may be done either via the web site 300 or via e-mail 700, and preferably posts a notification on the assigned project bulletin board to the owner/developer. The BSSP staffer retrieves and processes the drawings/specs sent by the architect by employing the program as described above to create the boxes and overlays, in the process, noting any discrepancies and communicates them to the designated parties, e.g., owners/developers and architects, typically via e-mail. Or an "Analysis-completed" notification is sent them, and the linked boxes and overlays are posted on the assigned project web page for retrieval at the convenience of the client and architects. The architects correct the drawings and resubmit to the BSSP for further review and linking. This process is iteratively repeated, and may involve engineers, surveyors 180, permit officials and/or other ancillary service providers 260, until the design phase is completed and no omissions are revealed. For each deliverable object, bid forms are then generated by the BSSP and linked to their corresponding processed drawings. Notification of availability is sent to appropriate contractors from which bids are desired by e-mail. In addition, the original drawings, overlays, specifications, specification overlays, permits, engineering reports, bid forms and related documentation (e.g., Request For Bids with deadlines) are saved in dedicated archive memory for future use and reference.

The contractors 220 retrieve the corresponding bid package comprising the drawings, specifications and bid forms, and any other related documentation needed e.g., RFBs, and notification is sent to the appropriate sub-contractors 240 from which bids are desired. In turn, each sub-contractor, for each appropriate deliverable object, retrieves the corresponding bid package. After review and processing, the sub-contractor enters and electronically signs its bid, including the required details of labor and material costs, bond, insurance information, availability, sequencing (prior work done requirements, etc.), and notifies the contractor(s). Typically, each contractor has its preferred set of sub-contractors, but some subs may work for a number of contractors, and correspondingly, some contractors may request bids from more that one sub-contractor on a particular deliverable object. The signed bids are saved in the system 500.

This process may occur by e-mail, or may be facilitated by, or elected by the owner/developer in concert with its architect, to be posted to the project web page. Typically each project web page is password protected, and, especially in the case of competitive bids, either encrypted or each contractor is assigned a sub-page under the project page (linked to it), so that the bids in effect remain electronically "sealed", as noted in arrow 700 in FIG. 23.

The contractors review the sub-contractor bids, approves selected sub-contract bids, and electronically countersigns them, either creating appropriate contracts (e.g., contracts conditional on it being awarded the project contract) and reserving the sub-contractors services. In turn, the contractors finalize their bids, electronically sign them and forward to the BSSP, where they are appropriately posted on (or made accessible via hyperlink from) the project page, and are archived. The owners/developers and architects are notified that the bid package (the completed RFB) is available for review and award. That is done, and the selected (winning) bid is countersigned by the owner/developer and the contractor is notified by e-mail.

Typically, a number of affiliate services 600 are involved at one or more steps of this bid management stage 340. The web site 300 preferably identify and provide hyperlinks 380 to approved affiliates who provide services to the clients of the BSSP, under fee based contracts 800 with the BSSP. These contracts typically call for commissions to be paid to the BSSP for the referral and use of the various services of the bid system and access to the web site 300 and the documentation generated and archived. For example, one or more lenders, insurers, lawyers, accountants, and title companies may be involved in review of one or more aspects of the bidding process and the ultimate approval of the bids before a project contract can be let. As before, the access to the documents is preferably via the project web page, or the secure, sealed bid packages submitted and archived, and communication are handled by e-mail 720. To the extent approvals or other types of sign-offs are required, the appropriate lender, insurer, title company, lawyer electronically signs the necessary forms, forwards them to the BSSP where they are archived, and the appropriate parties, e.g., contractors, architects and owners/developer are notified by e-mail. Formal notification e-mails are also archived in the bid system computers 500 for record purposes.

The winning contractor notifies its sub-contractors via e-mail, who retrieve their bid packages from memory 500 for use in performing their work. To the extent that the various documents have not been forwarded to the BSSP in CAD or other approved format, all participants submit the required paper (hard copy) documents for scanning and storage as electronic images for future access.

Moving then to the builder Control services 360 of the inventive Bid System 100, the owner/builder, architect, lender and permit/inspection entities selectively employ the BSSP to perform ongoing project construction monitoring and/or management functions. The BSSP 400 generates reports from information contained in the contracts for builder control personnel to review and use in their inspection and evaluation functions. These control personnel typically include construction oversight personnel in the developer, lender and architectural firms, and in the governmental offices responsible for inspection and code compliance, and approvals for payouts. All their documentation is submitted, preferably electronically including e-signatures, including sign-offs from owners, developers, lenders, insurers and architects, which are archived. The BSSP services also include generation of delivery of progress reports, determine inspection schedules, and management of lien waivers. This process continues through generation of and monitoring of work under project change orders to the ultimate clearance of post construction check lists and the acceptance and final pay outs by owner and lender. Documentation is archived at each step. Finally the conversion from construction loan to mortgage may also be managed and archived by the BSSP within the suite of services offered under the Internet-based business method of the invention employing the above-described bid system and its associated computer programs.

It should be noted that the archived plan and bid documentation created during the use of the Bid System of the invention may cumulatively constitute a valuable industrial asset. Thus historical databases of completed construction projects may be compiled which are searchable by persons, such as prospective buyers and lenders, who seek accurate and complete information related to the specifications and quality of the construction. These databases can be conveniently maintained by a service provider, such as a title insurance company, so as to be accessible in a commercially viable manner.

Furthermore, the mapping of overlays and boxes of system and method of the invention may be generalized as a mapping of subdivision defining regions to corresponding regions of an information-containing area, where the information-containing region may be in a wide variety of physical forms and may contain a wide variety of information types. Since this generalized embodiment of the system and method of the invention is likewise system of almost-orthogonal equations, the generalized embodiment likewise has the property of tending to increased transparency as the degree of subdivision increases. Thus the system may also be used to advantage to control, manage and verify information in a variety of fields, including industrial design, engineering specifications, electronic circuit architecture, and the like.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

APPENDIX

TABLE 1 - Logic Objects And Attributes

| Operation Or Attribute | Description Of Object Or Operation (See Class Diagram - Fig. 20) |
|---|---|
| CLIENT (Owner) | The client represents the customer with a project to be built. |
| CONTRACT<br><br>Private Attributes<br><br>Public Operations: | The contract is an agreement between signed parties to do a specified amount of work.<br><br>micon: icon - An icon will link all phases of the project together. This is assigned to a document.<br><br>Create(): Boolean - The "BSSP" will create a project for a client.<br>ImportContract(): Boolean - The ability to take an existing contract and import/scan into the system.<br>Print(): - The ability the print the current contract.<br>Select(): Contract - The ability the select the current contract. |
| OPERATOR (BSSP) | The operator or bid engineer is the main user of the Bid System who will be responsible for the maintenance of the entire life cycle of the project. |
| PROJECT<br>Public Operations: | The Project represents the profile for a specific job.<br><br>Create() : Boolean - The "Bid Engineer" will create a project for a client.<br>InsertContract (aContract : Contract) : Boolean - The ability to insert a contract into the project by means of import of scan.<br>InsertArchitecturalDrawings () : Boolean - The "Bid Engineer" inserts the Architectural Drawings into the project.<br>OpenProject () : Boolean - The ability to open the current project.<br>SaveProject () : Boolean - The ability to open the current project. |
| ARCHITECT DRAWINGS<br>Public Operations: | The Architectural Drawings are the actual drawings that the architect provides for this project.<br><br>Create () : boolean - The ability to create the attributes for a specific drawing.<br>ImportDrawings () : Boolean - The ability to import existing drawings provided the architect.<br>SelectDrawings () : Drawing - The ability to select the current drawing.<br>PrintDrawings () : - The ability to print the current drawing. |
| ARCHITECT | The Architect is responsible designing the drawing for a specific project. |
| OWNER ARCHITECT AGREEMENT | This agreement details the obligations of the architect through the course of the project. It is understood that the client has hired an architect to produce a complete set of architectural drawings. ("complete" means at least enough detail to obtain a building permit.) |

| | |
|---|---|
| LOG<br><br>Public Operations: | The Log tracts key activities that occurred during the life cycle of the project<br><br>LogAllBoxesCompletedDate() : Date - Log date when the bid engineer completes all boxes on all overlays. |

| Operation Or Attribute | TABLE 1 - Logic Objects And Attributes<br>Description Of Object Or Operation (See Class Diagram - Fig. 20) |
|---|---|
| | LogOwner ArchitectSignDate () : Boolean |
| | LogContractImportDate () : Boolean<br>LogOwnerContractorAgreementDate () : Boolean<br>LogImportofArchDrawingsDate () : Boolean<br>LogAddendumFormDate () : Boolean<br>LogBoxesModifiedDate () : Boolean<br>LogPrintDate () : Boolean<br>LogHardCopyCreationDate () :<br>LogStatementofAcceptanceDate () : Boolean<br>LogRequestClarificationDate () :<br>LogArchitectClarificationDate () : Boolean<br>LogContractorHardCopyReturnDate () : boolean |
| ICON<br><br>Public Operations: | The Icon is one of the key component of the system in that it associates the visual aspects (i.e. boxes on drawings) with the verbal aspect (i.e. contracts) of the project.<br><br>Link (): - The ability to tie one item with another |
| OVERLAY<br><br>Public Operations: | The overlay represents a layer on the architectural drawings that contains boxes associated with a particular sub-contractor category.<br><br>Create (aSubContractorCategory : Sub-contractor categories): boolean - The Bid Engineer creates the overlays.<br>SelectOverlay () : Overlay - The ability to select an overlay<br>FinalizeBoxes () : Boolean - The Bid Engineer will finalize the boxes. This will transfer the box coordinates to the appropriate contracts and fills all empty areas of the overlay with the null icon.<br>PrintOverlays () : Boolean - The ability to print the overlay with boxes and grids. |
| GRID<br>Public Operations: | The grid determines the coordinate system chosen for a drawing.<br><br>Create () : Boolean - The overlay created by the Bid Engineer creates grids. |
| SUB-CONTRACTOR CATEGORIES<br>Public Operations: | The sub-contractor categories contains the list of categories that will be bidden on by subcontractors.<br><br>QueryList () : List - The ability to query the list of categories. |

| BOXES<br><br>Private Attributes<br><br>Public Operations: | The boxes represent the area of the drawing that is bid upon. This will divide and conquer the project into smaller components to create a more accurate bid.<br><br>micon : Icon - An icon will link all phases of the project together. This is assigned to the box.<br><br>Create() : Boolean - The Bid Engineer creates boxes on the overlays on each sheet of the drawings.<br>Modify () : Boolean - The Bid Engineer modifies boxes on the overlays on each sheet of the drawings. |

| Operation Or Attribute | TABLE 1 - Logic Objects And Attributes<br>Description Of Object Or Operation (See Class Diagram - Fig. 20) |
|---|---|
| | Select () : Boxes - The ability to select a box. |
| ADDENDUM FORM | The addendum form is a contract that allows for clarification in the drawings by the architect. Derived from Contract: |
| CONTRACTOR | The Contractor is responsible for following:<br>1. sub-contracting portion of the project<br>2. collecting bids<br>3. analyze/confirm accuracy of drawings between client and architect<br>4. building the project<br>5. obtaining signatures and signing of contracts |
| BID<br>Public<br>Operations: | The bid is the cost related to each contract by each sub-contractor<br><br>Create () Boolean - The sub-contractor creates bids for this project<br>Collect () : Boolean - Contractor collect bids from the sub-contractor. |
| HARD COPY<br><br>Public<br>Operations: | The hard copy is a print out of the drawings, overlays, boxes, contracts and other associated documents to a project.<br><br>Create () : Boolean - The create command will print the hard copy. |
| STATEMENT OF ACCEPTANCE | The statement of acceptance is contract that is signed by the owner and the contractor upon acceptance of the hard copy of the project. Derived from Contract: |
| SUB-CONTRACTOR | The Sub-contractor is responsible for bidding and building the option associated with the project. |
| OWNER CONTRACTOR AGREEMENT | The Owner/Contractor Agreement is a contract between the owner and the contractor. This represents the signature of each party upon a specified task assigned to the contractor to collect the bids, etc. Derived from Contract: |
| DRAWING | The drawing is an individual architectural drawing. |

EXHIBIT A - LIST OF SUBCONTRACTS

| Reference Number | Subcontract Number | Category / Subcategory |
|---|---|---|
| | 001 | SITE CLEARING |
| 1 | 001-01 | Site clearing (brush landscaping, rocks any man made objects needing removal) |
| 2 | 001-02 | Hauling and clean-up of materials produced by site clearing |
| | 002 | EXCAVATION AND SITE WORK |
| 3 | 002-01 | Layout of excavations and rough grading |
| 4 | 002-02 | Rough grading |
| 5 | 002-03 | Excavation of all building foundation components |
| 6 | 002-04 | Excavation of footings for ret walls |
| 7 | 002-05 | Excavation for underground utilities and drain lines |
| 8 | 002-06 | Shoring (if required) |
| 9 | 002-07 | Hauling or storing excavated earth |
| 10 | 002-08 | Compacting of earth |
| | 003 | FOUNDATION |
| 11 | 003-01 | Layout and build foundation forms (surveyor?) |
| 12 | 003-02 | Layout and build forms for cmu ret. Wall footings |
| 13 | 003-03 | Construction of foundation forms |
| 14 | 003-04 | Construction of ret. Wall footing forms |
| 15 | 003-05 | Rebar installation |
| 16 | 003-06 | Rebar installation rebar in conc. Slabs |
| 17 | 003-07 | Installation of rebar in ret. Wall forms |
| 18 | 003-08 | Prepping of pad for slab |
| 19 | 003-09 | Install structural hardware (holddowns, A.B. etc.) |
| 20 | 003-10 | Pour footings, grade beams & pads |
| 21 | 003-11 | Pour slabs |
| 22 | 003-12 | Stripping of forms |
| 23 | 003-13 | Removal of debris |
| 24 | 003-14 | Backfilling at foundation |
| 25 | 003-15 | Backfilling at retaining walls |
| | 004 | MASONRY |
| 26 | 004-01 | CMU walls at foundation |
| 27 | 004-02 | CMU retaining walls |
| 28 | 004-03 | Fireplaces |
| 29 | 004-04 | Planters |
| | 005 | STRUCTURAL STEEL |
| 30 | 005-01 | Fabrication & delivery (including site measurements) |
| 31 | 005-02 | Installation) co-ordinated between framer/steel fabricator and foundation contractor: (crane may be needed) |
| 32 | 005-03 | Cutting / welding at site |
| 33 | 005-04 | Cutting / welding at site |
| | 006 | DRAINAGE |
| 34 | 006-01 | Subdrainage system |
| 35 | 006-02 | Sump pump garage floor? |
| 36 | 006-03 | Installation of surface drains |
| | 007 | FRAMING |
| 37 | 007-01 | Foundation cripple walls |
| 38 | 007-02 | Installation of subfloor system (inclusive from mudsill to plywood subfloor) |
| 39 | 007-03 | First floor walls (including shearwall systems) |

EXHIBIT A - LIST OF SUBCONTRACTS

| Reference Number | Subcontract Number | Category / Subcategory |
|---|---|---|
| 40 | 007-04 | Stairways |
| 41 | 007-05 | Upper floor walls |
| 42 | 007-06 | Upper wall framing |
| 43 | 007-07 | Roof and ceiling joist system |
| 44 | 007-08 | Trusses fabrication / delivery |
| 45 | 007-09 | Trusses installation |
| 46 | 007-10 | Fascia |
| 47 | 007-11 | Roof framing |
| 48 | 007-12 | Misc. Framing pick-up |
| 49 | 007-13 | Repair after other subs |
| 50 | 007-14 | Special architectural details |
| 51 | 007-15 | Purchase doors and windows |
| 52 | 007-16 | Installation of doors and windows |
| 53 | 007-17 | Regular and final cleanups |
| | 008 | ROOFING |
| 54 | 009-01 | Flashing & felt underlay |
| 55 | 008-02 | Waterproofing pre-roofing |
| 56 | 008-03 | Installation of tile roof |
| 57 | 008-04 | Any built up roofing (flat areas) |
| 58 | 008-05 | Install skylights |
| 59 | 008-06 | Clean-up and hauling of excess and waste roofing materials |
| | 009 | SHEETMETAL |
| 60 | 009-01 | Custom flashings & sheet metal |
| 61 | 009-02 | Rain gutters |
| | 010 | ELEVATORS |
| 62 | 010-01 | Freight elevator |
| 63 | 010-02 | Passenger elevator |
| | 011 | WATERPROOFING |
| 64 | 011-01 | Foundation walls |
| 65 | 011-02 | Exterior decks |
| 66 | 011-03 | Shower pans |
| | 012 | HEATING / AIR |
| 67 | 012-01 | Installation of FAU |
| 68 | 012-02 | Air conditioning system |
| | 013 | CENTRAL VAC SYSTEM |
| 69 | 013-01 | Installation - rough and finish |
| | 014 | ELECTRICAL |
| 70 | 014-01 | Install temp. Power pole for construction |
| 71 | 014-02 | All rough electrical |
| 72 | 014-03 | Service panel |
| 73 | 014-04 | SLJ13 panels |
| 74 | 014-05 | Elec. Finish |
| 75 | 014-06 | Security system |
| 76 | 014-07 | Installation of appliances |
| 77 | 014-08 | Cable TV |
| 78 | 014-09 | Telephone wiring |
| 79 | 014-10 | Landscape / site lighting & elec. |
| | 015 | PLUMBING |

EXHIBIT A - LIST OF SUBCONTRACTS

| Reference Number | Subcontract Number | Category / Subcategory |
|---|---|---|
| 80 | 015-01 | Temp water supply |
| 81 | 015-02 | All rough supply lines |
| 82 | 015-03 | Waste and vent lines |
| 83 | 015-04 | Connect waste line to street |
| 94 | 015-05 | Connect supply to city service |
| 85 | 015-06 | Steam system in shower |
| 86 | 015-07 | Set tubs (with frames?) |
| 87 | 015-08 | Run gas lines |
| 88 | 015-09 | Water heater |
| 89 | 015-10 | Install fixtures |
| 90 | 015-11 | Install finish |
| 91 | 015-12 | Drain lines for decks |
|  | 016 | FIRE SPRINKLERS |
| 92 | 016-01 | Rough installation |
| 93 | 016-02 | Finish installation |
|  | 017 | INSULATION |
| 94 | 017-01 | Floors, walls, ceilings |
| 95 | 017-02 | Water pipes / water heater |
|  | 018 | STUCCO |
| 96 | 01"1 | Lath and paper |
| 97 | 018-02 | Metal corners & expansion joint metal |
| 98 | 018-03 | Stucco exterior |
| 99 | 018-04 | Stucco - architectural |
| 100 | 018-05 | Stucco retaining walls |
| 101 | 018-06 | Stucco planter |
| 102 | 018-07 | Clean-up |
|  | 019 | DRYWALL |
| 103 | 019-01 | Ranging |
| 104 | 019-02 | Taping and finish |
| 105 | 019-03 | Clean-up |
|  | 020 | PAINTING |
| 106 | 020-01 | Painting preparation |
| 107 | 020-02 | Interior walls |
| 108 | 020-03 | Interior trim & woodwork |
| 109 | 020-04 | Special interior architectural |
| 110 | 020-05 | Staircase & handrails |
| 111 | 020-06 | Special exterior architectural |
| 112 | 020-07 | Exterior trim, doors & windows |
| 113 | 020-08 | Elastomeric exterior |
| 114 | 020-09 | Wrought iron |
| 115 | 020-10 | Sheet metal |
| 116 | 020-11 | Rain gutters |
| 117 | 020-12 | Caulking and sealing |
| 118 | 020-13 | Cabinets |
| 119 | 020-14 | Spiral staircase |
|  | 021 | INTERIOR FINISH CARPENTRY |
| 120 | 021-01 | Baseboards |
| 121 | 021-02 | Door and window casings |

EXHIBIT A - LIST OF SUBCONTRACTS

| Reference Number | Subcontract Number | Category / Subcategory |
|---|---|---|
| 122 | 021-03 | Crown moldings |
| 123 | 021-04 | Chair rails |
| 124 | 021-05 | Architectural details |
| 125 | 021-06 | Closet |
| 126 | 021-07 | Pull down attic ladder |
| 127 | 021-08 | Staircase work |
| 128 | 021-09 | Installation of doors & thresholds |
| 129 | 021-10 | Installation of all hardware |
| 130 | 021-11 | Weather stripping |
| 131 | 021-12 | Screens and screen doors |
| 132 | 021-13 | Shelves in garage |
|  | 022 | CABINETS |
| 133 | 022-01 | Kitchen cabinets (custom? Lazy Susans etc.) |
| 134 | 022-02 | Bathroom cabinets / linen |
| 135 | 022-03 | Laundry room cabinets |
| 136 | 022-04 | Custom built-ins |
| 137 | 022-05 | Storage in garage |
|  | 023 | FLOORING |
| 138 | 023-01 | Wood floors |
| 139 | 023-02 | Tile or stone floors |
| 140 | 023-03 | Carpet |
| 141 | 023-04 | Sheet goods |
|  | 024 | TILE GRANITE STONE |
| 142 | 024-01 | Tile countertops |
| 143 | 024-02 | Granite countertops |
| 144 | 024-03 | Showers & tubs |
| 145 | 024-04 | Decks |
| 146 | 024-05 | Exterior tile/stone |
|  | 025 | GLAZING |
| 147 | 025-01 | Bathroom mirrors |
| 148 | 025-02 | Wardrobe door/mirrors |
| 149 | 025-03 | Tub and shower enclosures |
|  | 026 | DECKS |
| 150 | 02&-01 | Deck finishes |
|  | 027 | ARCHITECTURAL DETAILS |
| 151 | 027-01 | Misc. Architectural details |
|  | 028 | WROUGHT IRON |
| 152 | 028-01 | Interior handrails |
| 153 | 028-02 | Exterior handrails |
| 154 | 028-03 | Gates or fences |
| 155 | 028-04 | Architectural details |
| 156 | 028-05 | Security bars |
|  | 029 | SPIRAL STAIRCASE |
| 157 | 029-01 | Fabrication, delivery, installation |
|  | 030 | GARAGE DOORS |
| 158 | 030-01 | Fabrication, delivery, installation |
|  | 031 | SITE WORK |
| 159 | 031-01 | Concrete flatwork & stairs |

EXHIBIT A - LIST OF SUBCONTRACTS

| Reference Number | Subcontract Number | Category / Subcategory |
|---|---|---|
| 160 | 031-02 | Driveway |
| 161 | 031-03 | Finish grading |
| 162 | 031-04 | Masonry hardscapes |
| | 032 | POOL SPA |
| 163 | 032-01 | Swimming pool |
| 164 | 032-02 | Spas |
| 165 | 032-03 | Fountains |
| 166 | 032-04 | Irrigation system |
| 167 | 032-05 | Landscape installation |
| | 033 | SITE LANDSCAPING |
| 168 | 033-01 | Irrigation system |
| 169 | 033-02 | Landscape installation |
| | 034 | MISC. ACCESSORIES |
| 170 | 034-01 | Interior accessories |
| 171 | 034-02 | Exterior accessories |
| | 035 | MISC. ACCESSORIES |
| 172 | 035-01 | Installation of appliances |
| | 036 | MISC. ACCESSORIES |
| 173 | 036-01 | Site toilet |
| 174 | 036-02 | Security fence for construction |
| | 037 | CONTINGENCY FOR SEVERE WEATHER CONDITIONS |
| 175 | 037-01 | Temp erosion control, measures |
| | 038 | CLEAN UP |
| 176 | 038-01 | Continuous clean-up of site |
| 177 | 038-02 | Final clean-up (interior) |
| 178 | 038-03 | Final clean-up (site) |

EXHIBIT B – Example Subcontract

| Subcontract : | | Balance From Previous Page For |
|---|---|---|
| Category 007 | | This Subcontract $ _____ |
| | | Balance From Previous Page for the |
| Subcategory 16 | | Owner/Contractor Agreement $ _____ |
| | | Date _____ |
| | | Initial _____ |

SECTION 8

THE WORK OF THIS SUBCONTRACT

007-16 - INSTALLATION OF DOORS AND WINDOWS

| This Subcontract of Sub-Category: | 16 | Of Category: | 003 | has | 1 | Section 8s |
|---|---|---|---|---|---|---|
| of which this is the | 1 | Section 8 | | | | |

8.1 The Subcontractor shall execute the following portion of the Work described in the Subcontract Documents, including all labor, materials, equipment, services and other items required to complete such portion of the Work, except to the extent specifically indicated in the Subcontract Documents to be the responsibility of others:

8.2 Scope Of The Work - The Scope of the Work of the subcontract is as follows:

The subcontractor shall be responsible for the installation of all interior and exterior doors and windows, including the installation of all door and window frames, sills, hinges, knobs, locks latches, view ports and hardware.

A more detailed discussion on the Work is given in Section 8.4 after the exact section of the Work described above is selected using the location technique of Section 8.3.

If the Subcontractor wishes to comment on the Scope of the Work above, note it here:

_____

_____

(Note: Write "none" if applicable)

If there are any Unique Features related to this Subcontract describe then here:

_____

(Note : Write "None' if this section is not applicable to any of the description above )

8.3 Location Of Work - The purpose of this subcontract system is to break down the building project into parts based on a grid, and to arrive at a binding cost estimate for the

| Page: _____ Of Section 8 Of: | Category: 03 |
|---|---|
| | Sub Category: 16 |

| Subcontract Page ___ Of A Total Of ___ Pages | To Next Page For This Subcontract $ _____ |
|---|---|
| Owner Contractor Page ___ Of A Total Of ___ Pages | Balance Forward To Next Page for |
| | the Owner/Contractor Agreement $ _____ |
| Date ___ Initial ___ | Date _____ |
| | Initial _____ |

EXHIBIT B – Example Subcontract

| Subcontract : | | Balance From Previous Page For |
|---|---|---|
| Category 007 | | This Subcontract $ _____ |
| | | Balance From Previous Page for the |
| Subcategory 16 | | Owner/Contractor Agreement $ _____ |
| | | Date _____ |
| | | Initial _____ |

SECTION 8 work to be done within each of these identified parts. The sum of all these parts, of all locations for all trades, shall represent the building project as a whole. Each sub-contractor shall go to the drawings, identify exact locations of every part of the building project applicable to his trade, and provide a binding cost estimate for the work
5 encapsulated within each location. The work to be done is described in sections 8.2 and 8.4. The method used to identify each location is as follows:

All of the drawings have a grid system printed horizontally along the sides and along the vertical sides of the drawing. "map" grid system is referred to as a "map" grid system
10 with the grid having numbers along the horizontal direction and alphabetical letters along the vertical direction. Therefore, any point on the drawing can be characterized by an ordered pair of a letter description and a number description, for example B,3 would be the "B" height and the number 3 along the horizontal axis. In order to obtain more detail in the horizontal direction further decimal representation is given such as 3.11 which
15 would represent a point at 3.11. In a similar view it can be seen that D.BB would represent 3.11 in the vertical direction if we had 0 represented by A, 1 represented by B,2 represented by C,3 represented by D,4 etc. up to 9 represented by J. Hence arbitrary points such as F.BD; 4.25 would represent a point F.BD up, vertical which is 5.13 up and 4.25 along the horizontal. Note: Generally, the views used to describe the location
20 system are the plan view, the section view, and if necessary, the elevation view. Construction details are of course used in conjunction with these drawings to clarify all work to be accomplished.

It can be seen that if a set of points for a closed contour such as G.BC, 1.06 to G.B.C,
25 2.17 and then G,BC, 2.17 to C.DE, 2.17 and then C.DE, 2.17 to C.DE, 1.06 and then C.DE, 1.06 to G.BC, 1.06, then this contour identifies some portion of the building project. This enclosed contour together with a companion contour in an orthogonal direction completely defines a fixed box in space that identifies some portion of the project to be built. The contractor is then to prepare a binding cost estimate for all of the
30 work related to his trade within each "box". Based on the above description, it is necessary to select two views from the drawings plus any additional views, sections or notes to clearly and uniquely describe and isolate the area of this subcontract. ( Note: Normally, only four coordinates are needed for each contour, therefore "N/A" is entered into the other entries.)

| Page: _____ Of Section 8 Of: | Category: 03 |
|---|---|
| | Sub Category: 16 |

| Subcontract Page _____ Of A Total Of _____ Pages | To Next Page For This Subcontract $ _____ |
|---|---|
| Owner Contractor Page _____ Of A Total Of _____ Pages | Balance Forward To Next Page for |
| | the Owner/Contractor Agreement $ _____ |
| Date _____ Initial _____ | Date _____ |
| | Initial _____ |

EXHIBIT B – Example Subcontract

| Subcontract: | | Balance From Previous Page For This Subcontract $ |
|---|---|---|
| Category 007 | | Balance From Previous Page for the Owner/Contractor Agreement $ |
| Subcategory 16 | | Date ___  Initial ___ |

SECTION 8

In the electronic (network and Website) form of this document, each such contour or "box" is linked between the Drawings, the Contracts and other project documents by a "clickable" icon shown next to the contour description below. Click icon to open view menu for box (e.g., overlay/drawing view).

The first contour locations  Box 1  are on Drawing Number  A-8  at location
007-16-08-01
coordinates  AFA 545  to  DFA 545
then  DFA 545  to  DFA 475
then  DFA 475  to  AFA 475
then  AFA 475  to  AFA 545
then, as needed to describe, also:  N/A

The next contour locations  Box 2  are on Drawing Number  A-8  at location
007-16-08-02
coordinates  BAA 460  to  CAA 460
then  CAA 460  to  CAA 400
then  CAA 400  to  BAA 400
then  BAA 400  to  BAA 460
then, as needed to describe, also:  N/A

The next contour locations  Box 3  are on Drawing Number  A-8  at location
007-16-08-03
coordinates  CCF 460  to  DFA 460
then  DFA 460  to  DFA 433
then  DFA 433  to  CCF 433
then  CCF 433  to  CCF 460
then, as needed to describe, also:  N/A

The next contour locations  Box 4  are on Drawing Number  A-8  at location
007-16-08-04
coordinates  BAA 390  to  CAA 390
then  CAA 390  to  CAA 330

Category: 03
Sub Category: 16

| Subcontract Page ___ Of A Total Of ___ Pages | To Next Page For This Subcontract $ ___ |
|---|---|
| Owner Contractor Page ___ Of A Total Of ___ Pages | Balance Forward To Next Page for the Owner/Contractor Agreement $ ___ |
| Date ___ Initial ___ | Date ___  Initial ___ |

EXHIBIT B – Example Subcontract

| Subcontract: | | Balance From Previous Page For This Subcontract $ |
|---|---|---|
| Category 007 | | Balance From Previous Page for the Owner/Contractor Agreement $ |
| Subcategory 16 | | Date |
| | | Initial |

SECTION 8

|  |  |  |  |  |
|---|---|---|---|---|
|  | then | CAA 330 | to | BAA 330 |
|  | Then | BAA 330 | to | BAA 390 |
| then, as needed to describe, also: | N/A | | | |

| The next contour locations | Box 5 | are on Drawing Number | A-8 | at location |
|---|---|---|---|---|
| | coordinates | CCF 390 | to | DFA 390 |
| 007-16-08-05 | then | DFA 390 | to | DFA 330 |
| | then | DFA 330 | to | CCF 330 |
| | then | CCF 330 | to | CCF 390 |
| then, as needed to describe, also: | N/A | | | |

| The next contour locations | Box 6 | are on Drawing Number | A-8 | at location |
|---|---|---|---|---|
| | coordinates | GCF 545 | to | HJA 545 |
| 007-16-08-06 | then | HJA 545 | to | HJA 475 |
| | then | HJA 475 | to | GCF 475 |
| | then | GCF 475 | to | GCF 545 |
| then, as needed to describe, also: | N/A | | | |

| The next contour locations | Box 7 | are on Drawing Number | A-8 | at location |
|---|---|---|---|---|
| | coordinates | GCF 460 | to | HJA 460 |
| 007-16-08-07 | then | HJA 460 | to | HJA 400 |
| | then | HJA 400 | to | GCF 400 |
| | then | GCF 400 | to | GCF 460 |
| then, as needed to describe, also: | N/A | | | |

| The next contour locations | Box 8 | are on Drawing Number | A-8 | at location |
|---|---|---|---|---|
| | coordinates | HDA 390 | to | HJA 390 |
| 007-16-08-08 | then | HJA 390 | to | HJA 330 |
| | then | HJA 330 | to | HDA 330 |
| | then | HDA 330 | to | HDA 390 |

| Page: ___ Of Section 8 Of: | Category: 03 |
|---|---|
| | Sub Category: 16 |

| Subcontract Page ___ Of A Total Of ___ Pages | To Next Page For This Subcontract $ |
|---|---|
| Owner Contractor Page ___ Of A Total Of ___ Pages | Balance Forward To Next Page for the Owner/Contractor Agreement $ |
| Date ___ Initial ___ | Date |
| | Initial |

EXHIBIT B – Example Subcontract

| Subcontract: | Balance From Previous Page For |
|---|---|
| Category 007 | This Subcontract $ |
| | Balance From Previous Page for the |
| Subcategory 16 | Owner/Contractor Agreement $ |
| | Date |
| | Initial |

SECTION 8 then, as needed to describe, also: __N/A__

| The next contour locations | Box 9 | are on Drawing Number | A-8 | at location |
|---|---|---|---|---|
| | coordinates | ICA 390 | to | IFF 390 |
| 007-16-08-09 | then | IFF 390 | to | IFF 330 |
| | then | IFF 330 | to | IFF 390 |
| | then | IFF 390 | to | ICA 390 |
| then, as needed to describe, also: | N/A | | | |

Additional location details - if the subcontractor feels the need to more clearly define the location of the work, encapsulated in the -box", or to identify areas outside the box that are
5  interconnected with the work inside the box, reference to these concerns should be noted here:

_____

8.4 Work Description - Using the method in section 8.3 the Contractor has now defined an area
10  within which the work described in section 8.2 is to be performed. It is understood that once the contours given in section 8.3 are determined dim each and every element of the work contained in that location can be identified and costed. This work is to be accomplished according to the conditions set forth in section 8.7.

It is also understood that there is the possibility that identified locations may be interconnected
15  with locations and tasks identified by other subcontracts, and in some locations more than one section 8 must be bid together for a complete description of the work. If this contract is valid only if associated subcontracts or associated section 8's of the sub-contracts are awarded together then they should be listed here:

20  Associated Section 8's: _____    Associated Subcontracts: _____
(Note: If no associated section 8s or associated subcontracts are needed for this contract to be valid, then mark "None" in each of the above blanks.

| Page: ___ Of Section 8 Of: | Category: 03 |
|---|---|
| | Sub Category: 16 |

| Subcontract Page ___ | Of A Total Of ___ | Pages |
|---|---|---|
| Owner Contractor Page ___ | Of A Total Of ___ | Pages |
| Date ___ | Initial ___ | |

| To Next Page For This Subcontract $ |
|---|
| Balance Forward To Next Page for |
| the Owner/Contractor Agreement $ |
| Date |
| Initial |

50

The invention claimed is:

1. A computer hardware and software-implemented method of reducing errors and uncertainty in construction projects for practical application in the field of architecture and the technological arts of construction and computer operations for efficient administration of construction contract bidding, letting and management processes, involving construction project work information included in construction project plans and construction project contracts and/or subcontracts, said plans including a plurality of construction plan sheet drawings of a construction project, said computer including a central processor and a computer readable memory device, and said software includes software code for controlling the operation of said computer, comprising the following steps in any operative order:
  (a) applying at least one electronic overlay from a computer memory to a digitized construction plan sheet as a representational surface corresponding to a selected construction trade or category of construction work to be performed on said project, said overlay being aligned with the plan sheet permitting defining by ordered sets of coordinates, a plurality of topological subdivision regions of said at least one construction plan sheet, each of said plurality of subdivision regions uniquely identifying, delineating and locating a selected portion of the construction work, object or element depicted graphically on said at least one plan sheet;
  (b) linking each of said plurality of overlay-defined subdivision regions to at least one of said construction project contracts or sub-contracts to accurately map the plan sheet depiction that identifies the selected portion of the construction work to be bid, to the correct contracts or sub-contract(s); and
  (c) incorporating said linked regions into said contract to graphically reference the scope of work to be performed under said contract depiction on said plan sheets to enhance the precision, clarity and completeness of said work, thereby to reduce errors and omissions in construction performance under said contracts and/or subcontracts.

2. A method of reducing errors and uncertainty in construction projects as in claim 1, wherein said step of applying said overlay to define topological subdivision regions includes:
  (a) inputting said at least one plan sheet as digitized electronic data to a computer data processing system including said central processor and computer-readable memory device;
  (b) storing said input plan sheet data as a digital data file in said computer-readable memory device;
  (c) defining in said plan sheet data said at least one subdivision region containing a portion of the project work by selecting points corresponding to at least 2-dimensional overlay essentially-orthogonal coordinates, said selected points defining areas in which said defined portion of the project work is graphically represented; and
  (d) storing said defined subdivision region as data in a table in said computer-readable memory device.

3. A method of reducing errors in construction projects as in claim 2 wherein said mapping of said overlay substantially orthogonal coordinates to said plans is provided by a system of almost-orthogonal equations having the property of progressively increasing transparency as the size of the subdivision cells is reduced.

4. A method of reducing errors and uncertainty in construction projects as in claim 2, further including the steps of:
  (a) providing a table in said computer-readable memory that includes a plurality of project subcontract work categories, each of said work categories corresponding to the work to be performed under one of said plurality of subcontracts; and
  (b) linking in said computer-readable memory said at least one subdivision region with a selected one of said work categories to create a data structure correlating said at least one subdivision region with said selected work category.

5. A method of reducing errors and uncertainty in construction projects as in claim 4, further including the steps of:
  (a) providing in said computer-readable memory at least one subcontract document file; and
  (b) linking in said computer-readable memory said selected work category to said contract and/or subcontract document file(s) to create in said data structure a correlation between said selected work category and said subcontract document file, and a correlation between said at least one plan sheet subdivision region and said contract and/or subcontract document file(s).

6. A method of reducing errors and uncertainty in construction projects as in claim 5, wherein said computer system includes a display device and a graphical user interface system further including the steps of:
  (a) associating in said computer readable memory a selected icon file with said at least one subdivision region of said at least one plan sheet;
  (b) displaying an image of said selected contract and/or subcontract document on said display device connected to said computer system;
  (c) displaying said selected icon as an image superimposed upon said contract and/or subcontract image; and
  (d) retrieving from said data structure an image of said subdivision region of said plan sheet in response to a selection of said icon using said graphic user interface to graphically display said portion of the work to be performed under said contract and/or subcontract.

7. A method of reducing errors and uncertainty in construction projects as in claim 5, further including the steps of:
  (a) associating an index reference with said at least one subdivision region and said at least one plan sheet;
  (b) printing said selected contract and/or subcontract document with said index reference included in said contract and/or subcontract document; and
  (c) printing an image of said indexed subdivision region superimposed upon said plan sheet to reference at least a portion of the work to be performed under said contract and/or subcontract by plan subdivision information being included in said plan sheet images.

8. A method of reducing errors and uncertainty in construction projects as in claim 5, wherein said subdivision defining step is selected from at least one of the steps of:
  (a) defining at least one closed boundary box coordinated with said plan sheet, said subdivision region comprising the plan area enclosed by said boundary;
  (b) defining at least one trace path upon said at least one plan sheet, said trace path delimiting a trace area of said plan sheet lying within a predetermined distance from said path, said subdivision region comprising said trace area;

(c) defining at least one center point upon said at least one plan sheet, said center point delimiting an area of said plan sheet lying within a predetermined geometric boundary shape coordinate with said center point, said subdivision region comprising the plan area enclosed by said predetermined boundary shape; and (d) defining a reference grid coordinate with said plan sheet, said grid dividing said sheet into a plurality of predefined sub-areas, and selecting one or more contiguous ones of said plurality of sub-areas, said subdivision region comprising said selected contiguous sub-areas.

9. A method of reducing errors and uncertainty in construction projects as in claim 1, wherein said plans and said contracts and subcontracts are accessibly and retrievably stored in electronic form in said computer readable memory device, and which includes the step of providing an Internet web-server configured for remote access of said plans, contracts and subcontracts for rendering and display via said web-server and for bi-directional flow of information related thereto including at least one of data, bids, comments, edits and changes.

10. A method of reducing errors in construction projects as in claim 1 wherein said mapping of said overlay substantially orthogonal coordinates to said plans is provided by a system of almost-orthogonal equations having the property of progressively increasing transparency as the size of the subdivision cells is reduced.

11. A method of reducing errors in construction projects as in claim 1 which includes the step of verifying completeness of mapping of the construction work, objects or elements by said computer processor executing code for at least one error detection algorithm that topologically proves completeness or non-duplication of topological subdivisions, by at least one of: a) com-paring coordinates of subdivision region boundaries on each plan page to determine if there are any that are not contiguous with or overlap other regions, or b) summing the total area of all subdivision regions on a plan sheet and comparing that sum to the area in which work is depicted on said plan sheet, to determine if there are less than all elements of the plan sheet that have been mapped.

12. A computer data processing system for electronically inter-linking selected sections of construction project plans to bidding contracts to reduce errors and uncertainty in construction projects by enhancing the precision, clarity and completeness of both said plans and said contracts, wherein the scope of work of said project is depicted in said plans, said plans comprising at least one sheet, and wherein said project work is bid by means of said bidding contracts, each of said bidding contracts including an agreement to perform specified portions of said project work, said data processing system comprising:

(a) a computer-readable memory means for storing at least one plan file including digital image information of said plan sheets, and for storing an overlay grid including essentially orthogonal coordinates;

(b) a computer display means connected to said memory means for displaying said plan sheet image;

(c) a computer processing means connected to said memory means for superimposing said overlay grid onto said plans to permit selection of coordinate information to define subdivision regions of said plans that uniquely bound and delineate selected portions of the project construction work depicted graphically on said plan shoot and for storing in said memory means said boundary defining information;

(d) a computer-operator interface means for selecting a closed boundary on said plan sheet imago to define at least one subdivision region of said plan sheet image, said subdivision region corresponding to a portion of the project construction work depicted in said plans; and (e) linking means connected to said memory means for linking said stored plan image and said stored boundary information to at least one bidding contract, so as to define a portion of the project work to be performed under said contract.

13. A computer data processing system as in claim 12 which includes a computer program including code for causing said computer system to be accessible by at least one remote user via the Internet.

14. An application computer program product for use in reducing errors and uncertainty in construction projects by the inter-linking of selected portions of construction project plans to relevant bidding contracts to enhance the precision, clarity and completeness of both said plans and said contracts, wherein:

(i) the scope of work of said construction project is at least in part defined by said plans comprising at least one plan sheet;

(ii) said project is bid by means of said bidding contracts, each of said bidding contracts including an agreement to perform specified portions of the construction project work; and (iii) said computer program product is for controlling application operations of a computer system including a processor, a memory, a display and an operator input device;

said computer application program product comprising a computer usable medium having computer readable program code embodied in said medium, said computer readable program code comprising:

(a) a first program code for causing said computer system to read files stored in said memory, said files including an image of at least one of said plan sheets and an overlay grid to permit selection of coordinates information to define subdivision regions of said plans that uniquely bound and delineate selected portions of the project construction work depicted graphically on said plan sheets;

(b) a second program code for causing said computer system to display said plan sheet image;

(a) a third program code for causing said computer system to accept operator-selected inputs that define as information a boundary around at least one subdivision region of said plan sheet image, said subdivision region corresponding to a portion of the project work depicted in said plans;

(d) a fourth program code for causing said computer system to store said boundary-defining information in said memory; and (e) a fifth program code for causing said computer system to link said stored plan image and said stored boundary information to at least one bidding contract, so as to more precisely, clearly and completely define a portion of the project work to be performed under said contract.

15. A computer program product as in claim 14, wherein said product includes a sixth program code for causing said computer system be accessible by at least one remote user via the Internet, said access of said remote user permitting said user to control the execution of at least one of said first through fifth program codes.

* * * * *